US008303816B2

United States Patent
Kent et al.

(10) Patent No.: US 8,303,816 B2
(45) Date of Patent: Nov. 6, 2012

(54) WETLAND BIOFILTER CHAMBER WITH PERIPHERAL CATCH BASIN AND METHOD OF USE THEREOF

(75) Inventors: Greg B Kent, Oceanside, CA (US); Zach J Kent, Oceanside, CA (US)

(73) Assignee: Modular Wetland Systems, Inc., Oceanside, CA (US)

( * ) Notice: Subject to any disclaimer, the term of this patent is extended or adjusted under 35 U.S.C. 154(b) by 0 days.

(21) Appl. No.: 13/215,077

(22) Filed: Aug. 22, 2011

(65) Prior Publication Data

US 2012/0091057 A1    Apr. 19, 2012

(51) Int. Cl.
*C02F 3/32* (2006.01)

(52) U.S. Cl. .................. 210/602; 210/617; 210/170.03; 210/263; 210/747.3

(58) Field of Classification Search .............. 210/97, 210/109, 121, 123, 170.03, 252, 263, 288, 210/617, 747.2, 747.3, 912, 602, 615, 616
See application file for complete search history.

(56) References Cited

U.S. PATENT DOCUMENTS

| | | | |
|---|---|---|---|
| 4,225,434 A | | 9/1980 | Ernst et al. |
| 4,833,083 A | * | 5/1989 | Saxena ................ 435/403 |
| 5,174,897 A | | 12/1992 | Wengrzynek |
| 5,198,113 A | * | 3/1993 | Daniels .............. 210/608 |
| 5,437,786 A | | 8/1995 | Horsley et al. |
| 5,549,817 A | | 8/1996 | Horsley et al. |
| 5,653,255 A | | 8/1997 | Platz |
| 5,702,593 A | | 12/1997 | Horsley et al. |
| 5,893,975 A | | 4/1999 | Eifert |
| 5,951,866 A | | 9/1999 | Grove et al. |
| 6,467,994 B1 | | 10/2002 | Ankeny et al. |
| 6,569,321 B2 | | 5/2003 | Coffman |
| 6,592,761 B2 | | 7/2003 | Wofford |
| 6,638,424 B2 | | 10/2003 | Stever et al. |
| 6,652,743 B2 | | 11/2003 | Wallace et al. |
| 6,905,599 B2 | | 6/2005 | Allard |
| 7,200,405 B2 | | 4/2007 | Rudolf et al. |
| 7,425,262 B1 | | 9/2008 | Kent |
| 7,470,362 B2 | | 12/2008 | Kent |
| 7,764,378 B2 | | 7/2010 | Oldham |
| 2003/0024874 A1 | | 2/2003 | Wallace et al. |

(Continued)

FOREIGN PATENT DOCUMENTS

JP          05132993          5/1993

(Continued)

*Primary Examiner* — Fred Prince
(74) *Attorney, Agent, or Firm* — Lisel M. Ferguson; Procopio, Cory, Hargreaves & Savitch, LLP

(57) ABSTRACT

A horizontal flow water treatment method and wetland biofilter apparatus provides a chamber with impermeable outer walls spaced away from permeable interior walls of a media filtration bed such that a catch basin is formed between the outer walls and the interior walls. The catch basin creates an open area around the perimeter of the interior walls for influent water to fill within the open area on all sides before penetrating the filtration media, providing a large surface area for influent water to interact with the media filtration bed. The influent water enters the catch basin in a horizontal flow path to provide for pre-settling of particulates before making contact with the filtration media. The biofilter design increases the available surface area of the media filtration bed by up to four times for a given volume of water, and thereby minimizes the loading or infiltration rate on the media filtration bed.

20 Claims, 19 Drawing Sheets

U.S. PATENT DOCUMENTS

| | | |
|---|---|---|
| 2003/0047509 A1 | 3/2003 | Whitehill |
| 2004/0074846 A1 | 4/2004 | Stever et al. |
| 2004/0173522 A1 | 9/2004 | Allard |
| 2005/0183997 A1 | 8/2005 | Happel et al. |
| 2006/0151387 A1 | 7/2006 | Yost et al. |
| 2008/0142438 A1* | 6/2008 | Kent .............................. 210/602 |
| 2009/0045145 A1 | 2/2009 | Kent |

FOREIGN PATENT DOCUMENTS

WO  WO 2008/127479  10/2008

* cited by examiner

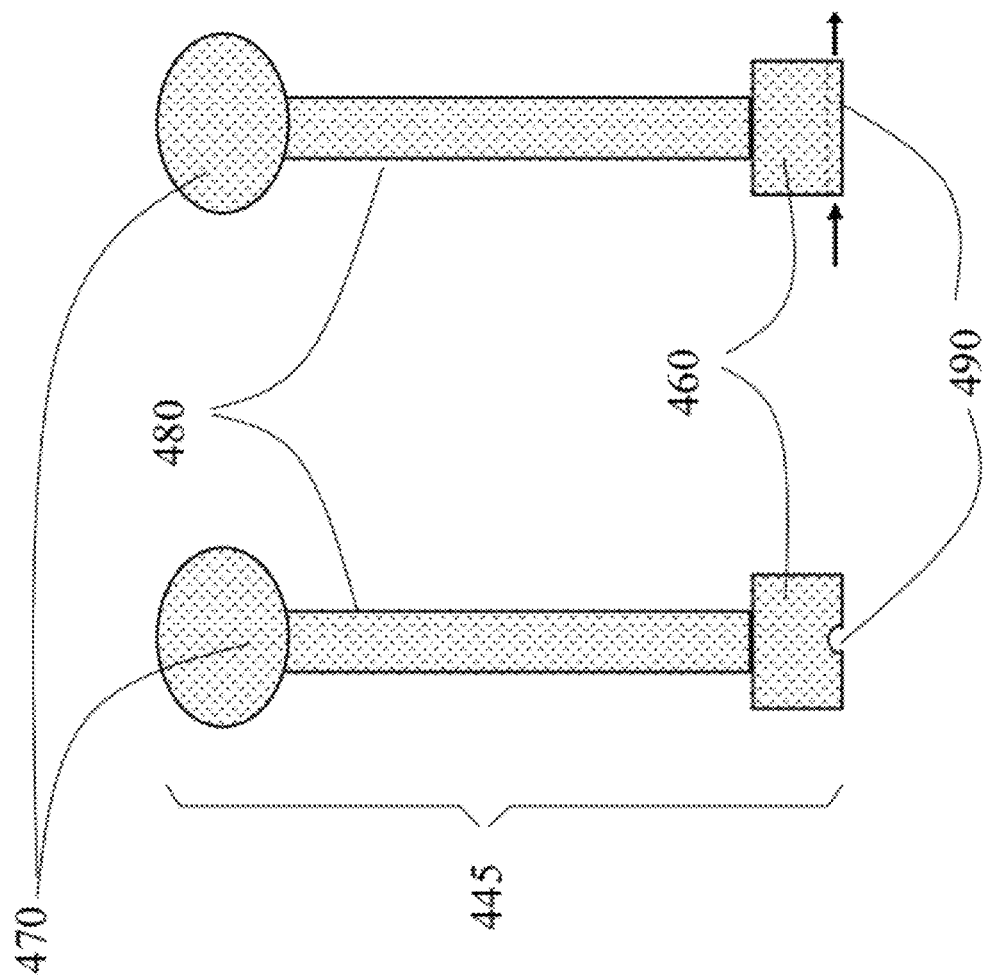

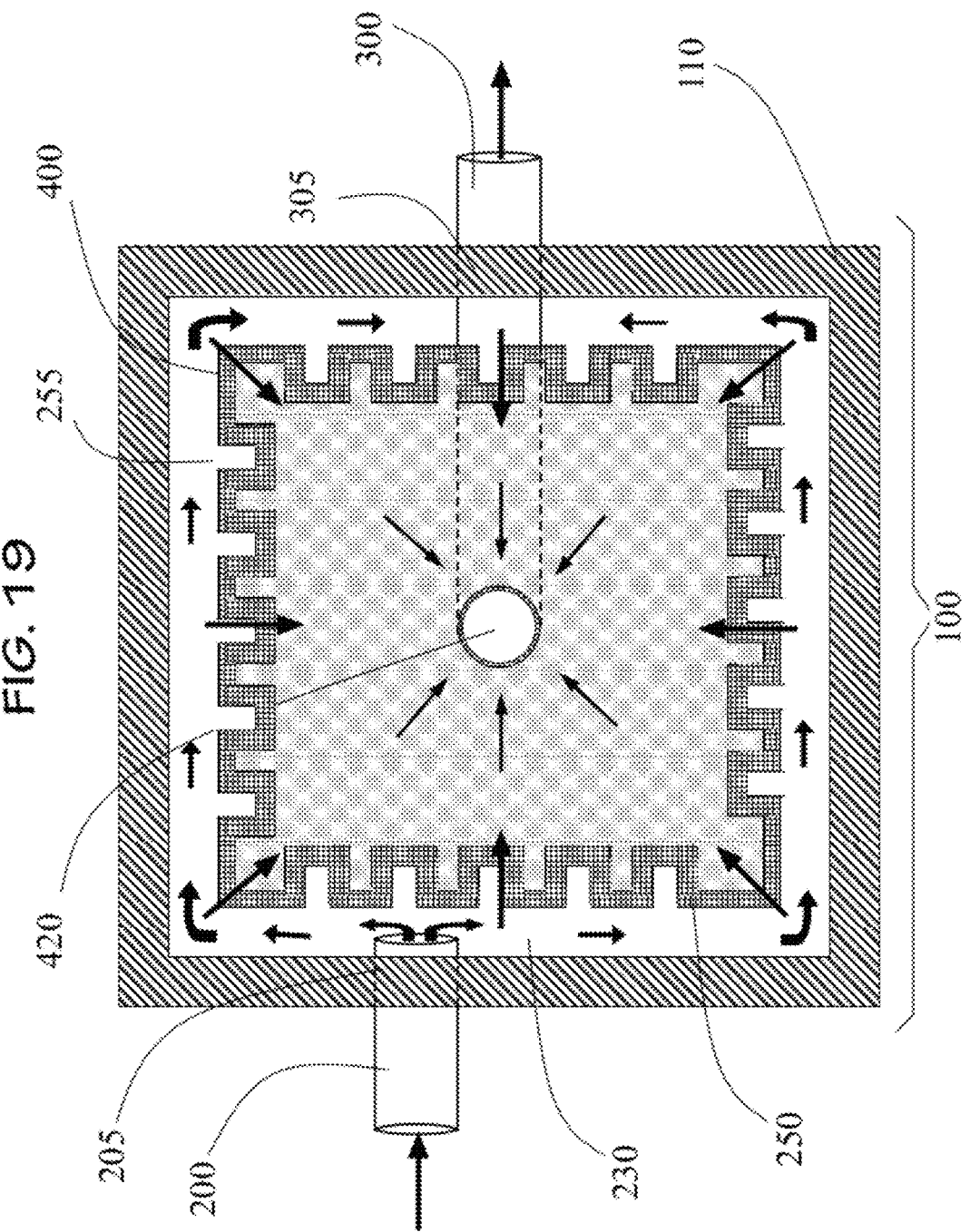

WETLAND BIOFILTER CHAMBER WITH PERIPHERAL CATCH BASIN AND METHOD OF USE THEREOF

FIELD OF THE INVENTION

The present invention relates, in general, to a water capture/drainage and treatment system and a method of using the same. More particularly, the present invention relates to a chamber for a wetland biofilter system which allows for horizontal flow of water through the system and which provides a peripheral catch basin between an outer wall and an interior wall of the chamber for receiving influent water before it interacts with a media filtration bed disposed within the interior walls.

BACKGROUND OF THE INVENTION

Water treatment systems have been in existence for many years. These systems treat stormwater surface runoff or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse affects on the health and ecological balance of the environment.

The Clean Water Act of 1972 set the stage for vast improvements to a water infrastructure and quality. Water pollution has been divided into two categories: point source and non-point source. Point sources include wastewater and industrial waste. Point sources are more easily identifiable, and therefore direct measures can be taken to control them. The other category, non-point source, is more difficult to identify. Stormwater runoff is the major contributor to non-point source pollution in rivers, lakes, steams and oceans. Studies have suggested and confirmed the leading cause of pollution to our waterways is from contaminated stormwater runoff. As we build houses, buildings, parking lots, roads and other impervious areas, we increase the amount of water that runs off the land and into our stormwater drainage systems, which all lead to rivers, lakes, streams and the ocean. As more land becomes impervious, less of the rain seeps back into the ground. This leads to less groundwater recharge and higher velocity flows in streams, which cause erosion and increased loads of contaminants into these waterways.

There are numerous sources of pollutants that are present in stormwater runoff. Sediments come from hillsides and other natural areas that are disturbed during construction and other human activities. When land is stripped of vegetation the soil more easily erodes and finds its way to storm drains. Trash and other unnatural debris are dropped on the ground every day which find its ways into the drainage system and ultimately our waterways. Leaves from tress and grass clippings from landscape activities that land on hardscape areas no longer decompose back into the ground but flow to our storm drains and collect in huge concentrations in lakes and streams. These organic substances leach out huge loads of nutrients and they decompose and cause large algae blooms which deplete the dissolved oxygen levels and kill fish and other organisms. Other unnatural sources of nutrients including nitrogen, phosphorus, and ammonia come from residential and agricultural fertilizers that are used in access and find there way to storm drains. Nutrients are one of the number one pollutants of concern in our nations.

Other major pollutants of concern include heavy metals which come from numerous sources and are harmful to fish and other organisms including humans. Many of our waterways are no longer safe to swim in or fish in and therefore no longer have any beneficial use. Heavy metals include but are not limited to zinc, copper, lead, mercury, cadmium and selenium. These metals come from car tires and break pads, paints, galvanized roofs and fences, industrial activities, mining, recycling centers, any metal materials left uncovered. Other major pollutants of concern are hydrocarbons which include oils & grease. These pollutants come from leaky cars and other heavy equipment and include hydraulic fluid, break fluid, diesel, gasoline, motor oils, cooking oils and other industrial activities.

Bacteria, pesticides and organic compounds are a few other categories of pollutants which are also harmful to our waterways, wildlife and humans. Over the last 20 years the EPA has been monitoring the pollutant concentrations in most of the streams, rivers and lakes throughout the country. Over 50% of our waterways are impaired for one or more of the above mentioned pollutants. As part of the Phase 1 and Phase 2 NPDES permits which control industrial and non-industrial development activities the control of these sources of pollutants in now mandated. Phase 1 was initiated in 1997 and Phase 2 was initiated in 2003. While there are many requirements to these permits the three main focuses are on source control, during construction pollution control and post construction pollution control. Post construction control mandates that any new land development or redevelopment activities are required to incorporate methods and solutions that both control increased flows of rain water off the site and decrease (filter out) the concentration of pollutants off of these developed sites. These are commonly known as quantity and quality control. Another part of the these requirements is for existing publicly owned developed areas to retrofit the existing drainage infrastructure with quality and quantity control methods and technologies to decrease the existing amount of rain water runoff and pollutant concentrations.

One of the main categories of technology that help with obtaining these goals are referred to as structural best management practices or BMPs. Structural BMPs are proprietary and non-proprietary technologies that are developed to store and/or remove pollutants from stormwater. Methods such as detention ponds, regional wetlands are used to control the volume of runoff while providing some pollutant reduction capabilities. Over the past 10 years numerous technologies have been invented to effectively store water underground and thus freeing up buildable land above them. Various treatment technologies such as catch basin filters, hydrodynamic separators, media filters are used to remove pollutants. These technologies commonly work by using the following unit processes: screening, separation, physical filtration and chemical filtration.

Other technologies such as bio swales, infiltration trenches, and bioretention areas commonly known as low impact development (LID) or green technologies have recently been implemented in the last 10 year to both control flow volumes and remove pollutants on a micro level. These LID technologies have proven successful at removing difficult pollutants such as bacteria, dissolved nutrients and metals as they provide not only physical and chemical, but also biological filtration processes by incorporating a living vegetation element which creates a living microbial community within the media by the plants root systems which assist in pollutant removal. Biological filtration processes have proven to be excellent at removing many of the pollutants that physical and chemical filtration systems alone cannot. While these technologies are effective they take up substantial amounts of space which are not always available on various construction projects. As such a need has arisen for compact LID technologies that offer the same advantages as their larger and space expensive counterparts.

Recent technology advancements in the field have focused on taking the traditional bioretention concept which is focused around vertical downward flow media filtration beds that pond water on top of the bed and making them up to $10^{th}$ of the size smaller by using high flow rate filtration media. As with traditional large bioretention systems these new compact bioretention systems accept stormwater runoff directly without pre-treatment and therefore receive large amounts of particulates that can clog the media filtration bed. This clogging as been exacerbated with these compact systems as the surface area of the media is only one tenth that of the traditional large bioretention systems. These downward flow systems are notorious for clogging as sediments accumulate on top of the media filtration beds surface. The need for a better way of making biofiltration system which allows the systems to still be compact but maximizes the media surface area for a given media bed volume. The greater the surface area for a given volume of bed media the lower the loading rate on the media and therefore less probability of clogging. Also, the traditional downward vertical flow path through a media bed is the most problematic for clogging as gravity allows inflow particulates to quickly and easily accumulate on top of the media bed.

Stormwater is characterized by large concentrations of various pollutants including trash, debris and sediments. Reports have shown that for urbanized area an average of 7.6 cubic feet of trash and 2.4 cubic yards of sediment are generated per acre of impervious surface per year. In many areas, where proper erosion control measures are not taken, which is common, the loading of sediment is much higher. Therefore, a system which has a media bed designed to minimize clogging along with a pre-treatment chamber to remove trash and sediments provides huge advantages to the end user. The maintenance of all stormwater BMPs can be very expensive and a burden to property owners. There is, thus a need to a system that can minimize maintenance costs.

Also, with changing stormwater regulations, a move is being made from flow based design to volume based design. Volume based design requires treatment along with volume control. Volume based design requires not only a treatment system but a storage system. Only horizontal flow media bed filters that included live vegetation can be placed downstream of the storage system. By having the vegetated media bed filter down stream allows it to also provide the flow control. This eliminates the need for a separate flow control structure which is costly. Having the media bed filter downstream also allows the water to be metered through the system over an extending period of time as a much slower flow rate when compared to flow based design. This further reduces the surface area loading rate which further minimizes clogging and also drastically increases the hydraulic retention time. The longer the retention time the higher the performance ability of the system.

Some systems include a wetlands chamber having a vegetative submerged bed, one or more walls, a floor, one or more inlet water transfer pipes and one or more outlet water transfer pipes. Examples of related systems are described in U.S. Pat. No. 7,425,262 B1, U.S. Pat. No. 7,470,362 B2 and U.S. Pat. No. 7,674,378, the contents of each of which are incorporated herein by reference in their entirety. In other systems, each of the walls and floor have an inner and outer metal mesh wall, with a space between the inner and outer walls to house stonewool filtration media slabs. Having a catch basin or chamber also includes one or more inflow pipes in one or more of the four walls to allow influent to pass into the catch basin. The system is configured so that the sediments and associated pollutants settle out of the influent and accumulate on the floor of the catch basin or chamber. A filtration panel comprising four or more walls enclosing an open space housing a filtration media, the walls being water permeable in structure to allow passage of water in either direction, the filtration media filling the entire inner chamber of the filtration panel and being water permeable.

Contaminated water such as stormwater and waste water contain high levels of particulate pollutants such as TSS, metals, organics, nutrients and hydrocarbons. These particulates cause media filtration beds to clog, which decreases their treatment flow capacity and increases the maintenance and replacement requirements of the granular media within the media filtration bed. Because of this a need has arisen that further increases the amount of initial media bed surface area for a given volume of filter media. By increasing the amount of available media bed surface area for a given volume of media the surface loading rate decreases for a given flow of water and therefore decreases the rate at which media will clog due to particulates.

Traditional downward flow media filtration beds have their initial media surface area lay horizontal perpendicular with the force of gravity. Therefore, pollutant particles accumulate on top of the media bed and clog the media at a much faster rate and thereby decreasing the media filtration bed's flow rate and performance, along with increasing the required maintenance and decreasing the life of the media before replacement is needed.

With the ever changing stormwater regulations a system that provides features that lowers maintenance costs, increases performance and pollutant removal and can be integrated with storages systems and placed downstream are in great need and demand. The smaller these systems are the easier they can be integrated into urban areas with limited room. The easier it is made to incorporate these systems in urban areas the greater overall affect we will have at reducing pollution to our precious rivers, lakes and streams.

SUMMARY OF THE INVENTION

Embodiments described herein are directed to a horizontal flow wetland biofilter system comprising including a chamber with impermeable outer walls spaced away from permeable interior walls of a media filtration bed to form a peripheral catch basin. The catch basin provides an open area around the perimeter of the interior walls for influent water to fill within the open area on all sides of the chamber, thereby providing a large surface area for influent water to penetrate the filtration media. The influent water enters the chamber and penetrates the media filtration bed in a horizontal flow path in order to provide for pre-settling of particulates before making contact with the media filtration bed. The chamber may be disposed below ground and connected with an adjacent chamber for receiving influent water. The chamber may additionally include a flow control orifice or flotation valve to further regulate the flow of water through the chamber.

In one embodiment of the invention, a wetland biofilter chamber comprises: one or more outer side walls and a floor section defining a substantially enclosed chamber; a media filtration bed disposed within the chamber and defined by one or more permeable inner side walls, wherein the permeable inner side walls of the media filtration bed are separated from the outer side walls of the chamber and define a catch basin for receiving an influent; a collection tube disposed within the media filtration bed and extending vertically from a top portion of the media filtration bed to a lower portion of the media filtration bed; and at least one outlet opening connecting the lower portion of the collection tube with an outside of the chamber.

The outer side walls and floor section may be impermeable.

The one or more outer side walls may include an intake opening to receive an influent into the catch basin.

The intake opening may be located on a lower half of a side wall.

The wetland biofilter chamber may further comprise an outlet tube disposed horizontally across the floor section of the chamber and connecting the collection tube with the at least one outlet opening.

The collection tube may be permeable.

The permeable collection tube may be perforated.

The height of the collection tube may be approximately 5% to approximately 100% of the height of the media filtration bed.

The collection tube may further comprise a restriction plate which restricts the flow of filtered influent to the outlet tube.

The restriction plate may be connected with a flotation valve disposed within the collection tube which controls the restriction plate based on a level of influent in the collection tube.

The catch basin may have a width of approximately 0.1 inches to approximately 10 feet.

The catch basin may have a width of approximately 1 inch to approximately 2 feet.

The height of the inner side walls may be approximately 25% to approximately 100% of the height of the chamber walls.

The thickness of the media filtration bed may be approximately 0.25 inches to approximately 80 feet.

The thickness of the media filtration bed may be approximately 1 to approximately 4 feet.

The catch basin may include a substantially hollow structural matrix.

In another embodiment, a method of filtering influent in a biofilter chamber comprises: receiving an influent into a catch basin of the biofilter chamber, wherein the catch basin is disposed around an inner periphery of the chamber between one or more outer side walls of the chamber and one or more inner permeable inner side walls of a media filtration bed; filtering the influent through the media filtration bed; collecting the filtered influent from the media filtration bed at a collection tube extending vertically within the media filtration bed from a top portion of the media filtration bed to a lower portion of the media filtration bed; passing the filtered influent from the collection tube to at least one outlet opening connected with an outside of the biofilter chamber.

The method may further comprise receiving the influent into the catch basin from an intake opening located on a lower half of a side wall.

The method may further comprise receiving the influent into the catch basin from an intake opening located on an upper half of a side wall.

The method may further comprise receiving the influent into the catch basin from an opening in the top of the biofilter chamber.

The method may further comprise passing the filtered influent from the collection tube to the at least one outlet opening using an outlet tube disposed horizontally across the floor section of the chamber and connected on a first end with the collection tube and on a second end with the at least one outlet opening.

The method may further comprise restricting the flow of influent using a restriction plate disposed within the collection tube.

The method may further comprise restricting the flow of filtered influent when a flotation valve disposed within the collection tube and connected with the restriction plate falls below a defined level.

The method may further comprise receiving the influent from an adjacent storage chamber or pre-treatment chamber.

From this description, in conjunction with other items, the advantages of the said invention will become clear and apparent more so based upon the hereinafter descriptions and claims, which are supported by drawings with numbers relating to parts, wherein are described in the following sections containing the relating numbers.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIGS. 18A and 18B are side and front views, respectively, of a float valve with a small flow orifice extending along a base of a valve stop; and FIG. 19 is a top plan view of an embodiment of the horizontal flow wetland biofilter system illustrating a permeable inner wall with an irregular surface area.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Overview

A water filtration apparatus with a unique filtration chamber design that maximizes the available surface area of filtration media for a given volume of water will be described herein. The water filtration system includes an enclosed chamber that houses a media filtration bed and a structural matrix or permeable wall that creates a void space, or catch basin, between the chamber's outer side wall(s) and the inner surface walls of the media filtration bed. The catch basin creates a continuous open area around the perimeter of the media filtration bed between the media filtration bed perimeter and the chamber side walls, so that influent contaminated water will fill the catch basin before penetrating the media filtration bed. With the media filtration bed encompassed within internal permeable walls spaced from the chamber side walls, the apparatus provides up to four times more surface area than a downward flow bioretention system.

The water filtration apparatus also operates by horizontal flow, such that the influent water is received at a side portion of the apparatus, such as through an opening in one of the chamber side walls or even an opening in the bottom surface of the chamber. The horizontal flow path allows for contaminated water to enter the chamber sub-surface via pipe or sheet flow into the top of the chamber. The benefits of horizontal flow will be described further herein.

Exemplary Embodiments

Figure 1:
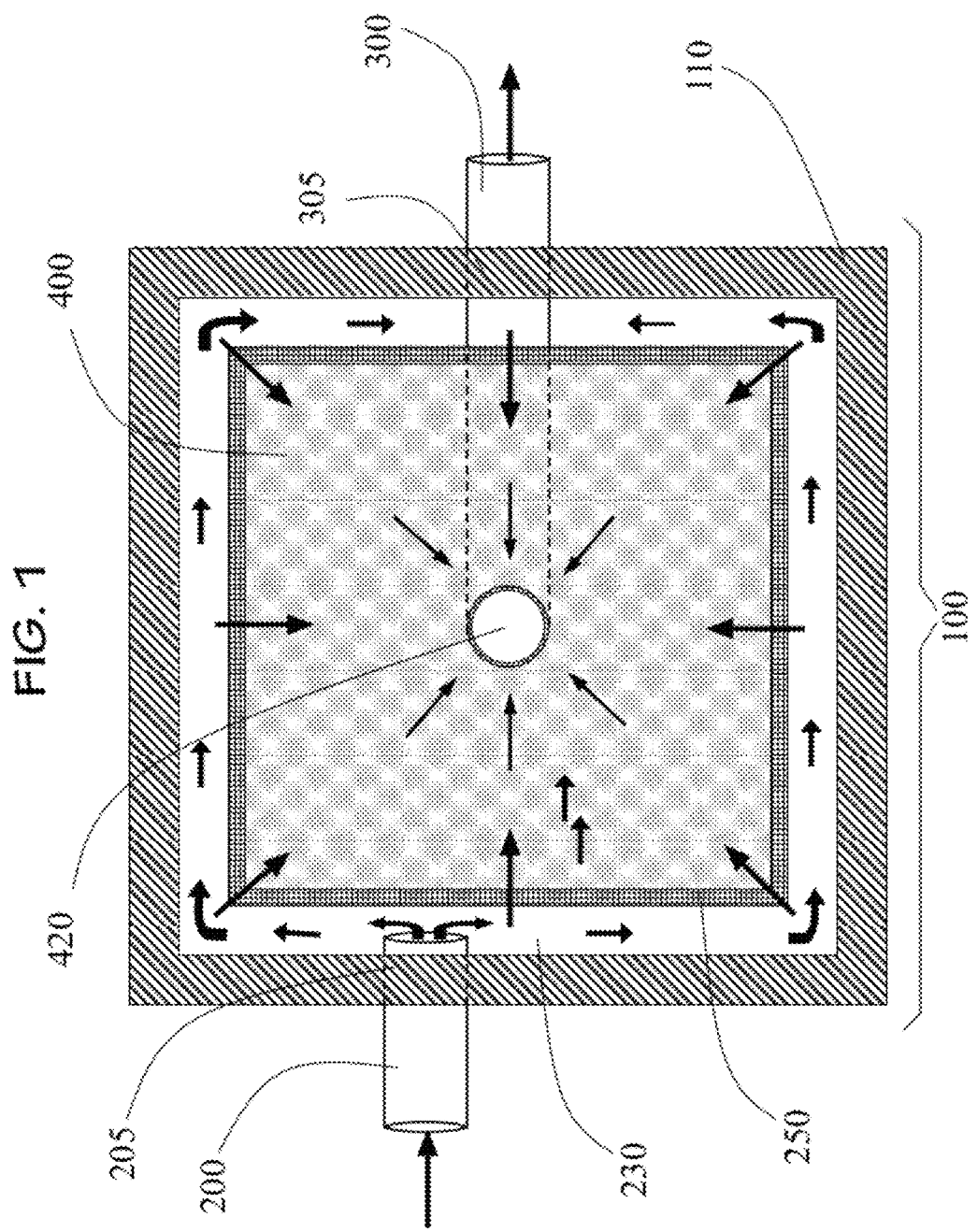
FIG. 1 is a top plan view of an embodiment of a horizontal flow wetland biofilter system with a catch basin.
Figure 2:
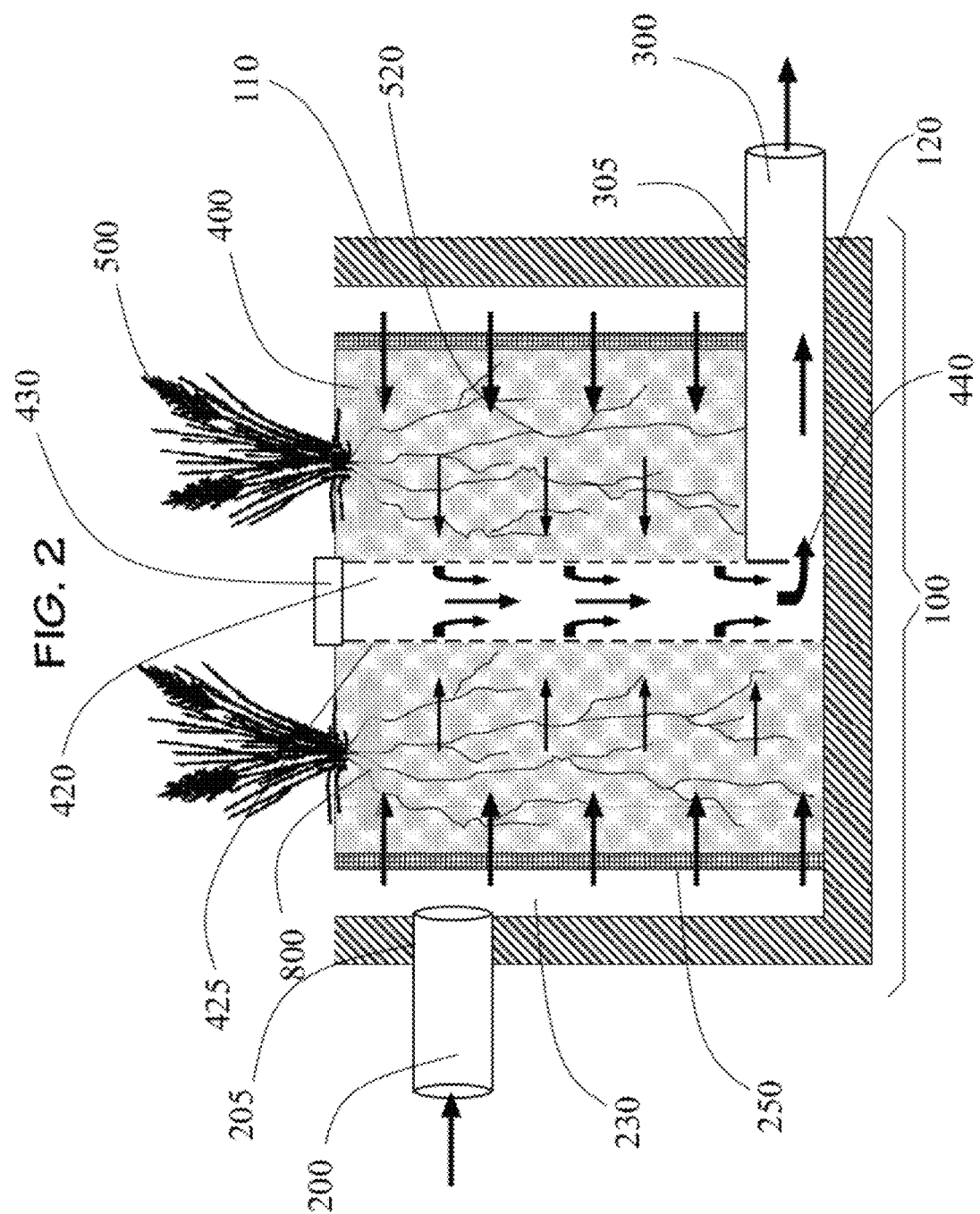
FIG. 2 is a side elevational section view of an embodiment of the horizontal flow wetland biofilter system.

With reference to FIGS. 1 and 2, an embodiment of a horizontal flow wetland biofilter system chamber 100 are shown and will be described, the chamber 100 being composed of a floor 120 defined by walls 110 running generally perpendicular to the floor 120 on all sides. One of the walls with an opening 205 in which a pipe 200 allows water to flow into the chamber subsurface and into the perimeter catch basin 230 which is defined as the area between the chamber walls 110 and the internal permeable walls/partitions 250. The perimeter catch basin 230 extends vertically from the floor 120 upward to the top of the chamber walls 110. Water may fill the chamber to the top of the chamber walls 110 or to a height equal to the invert of an upstream bypass outside of the chamber 100. As the water fills up the column of the catch basin larger particulates present in the water will settle to the floor. Also, as water fills the perimeter catch basin on all sides 230 it builds up hydraulic head pressure which provides the forced needed for it to flow horizontally inward through the permeable walls/partitions 250 which are made of a material that has a generally high open area for maximum water flow with the opening beings smaller in size than the media granules of the media filtration bed 400 held within the interior of the permeable walls/partitions 250. In one embodiment, the catch basin may have a width of approximately 1 inch to 24 inches, but generally it is at least approximately 6 inches wide in order to facilitate access by a standard vacuum hose for cleaning.

The permeable walls/partitions mirror the chamber walls in shape put with a smaller perimeter length. The permeable walls/partitions contain the media filtration bed. In general, the permeable walls/partitions are at least 25% the height of the chamber walls and may be the same height as the chamber walls. The permeable walls/partitions are created by several yet similar methods are not limited to the following: perforated metal, pervious pavers, concrete, or asphalt, geofabric, netting, screens and structural matrixes that are covered in a netting or screen. The permeable walls/partitions have openings that are generally smaller than the size of the granules within the media filtration bed. In general, the permeable walls/partitions have at least 30% void space. The permeable walls/partitions must of sufficient strength not to warp in shape and must maintain the void space between the media filtration bed and chamber walls on all sides to insure a continuous perimeter void area to allow water to flow around with impediment.

The media filtration bed extends the height of the permeable walls/partition or structural matrix. The said media filtration bed is composed of various granular filtration media in various sizes and quantities. The composition of the media mix can vary depending on the targeted pollutants of concern. Types of media used are the following but not limited to: perlite, expanded aggregate, soil, compost, waste water residuals, zeolite, polymers, stone, top soil, sand, activated charcoal, iron oxide, aluminum oxide, bio balls, stonewool or rockwool, and other organic or inorganic materials. The flow through the media is horizontal from its surface adjacent to the permeable walls/partitions to the perforated tube in the middle. The thickness of the media can be between a few centimeters to hundreds of feet. In general, the thickness of the media is between 12 and 48 inches. The top of the media filtration bed contains blocks or a mat of inorganic material such as rockwool, stonewool, coconut coir or similar that are placed just below the surface of the media filtration bed and laid in a horizontal orientation. The purpose of the said material is to provide a base for the establishment of plants and vegetation. The referenced material is generally used for the growing of plants by the hydroponic method which is also referred to as soil-less agriculture. The materials referenced above retain the moisture in the perfect air to water ratio for plant life.

As water flows horizontally through the media filtration bed 400, pollutants carried in the water such as hydrocarbons, particulates, metals, nutrients, pathogenic bacteria and chemicals are removed by a combination of physical filtration, chemical filtration and biological filtration. The inclusion of vegetation 500 growing out the top of the chamber 100 within the media filtration bed 400 allows for the establishment of their root systems 520 to take place. The root systems penetrate vertically downward through the column of the media filtration bed 400 which enhances the biological removal of pollutants through sorption, transformation and uptake by the root system 520 and the surrounding beneficial microbial community. The establishment of vegetation in biofilter system is generally difficult because the granule media in the media filtration bed 400 is fast draining and does not hold enough moisture close to the surface for the vegetation root systems to establish. To overcome this, a layer of soil-less inert growing media 800 is laid just below the surface of the media filtration bed 400 horizontally where the vegetation's root system will start to establish. The soil-less grow media 800 is generally made of rockwool, stonewool, coconut coir or similar which is designed to have a high internal void space and hold substantial amounts of moisture while providing an ideal air water ratio to optimal plant growth.

Collection Tube

The water travels, horizontally, through the media filtration bed 400 toward the center of the chamber which contains a vertically extending tube 420 which has a series of horizontally perforated slots 425 that are spaced vertically from the bottom to the top of the tube. The perforations 425 allow water to enter the inside of the tube 420 and travels downward, at the bottom of the chamber 100 the perforated tube 420 is connected to by a 90 degree elbow to a solid horizontal tube 300 that connects to an opening in the chamber wall 305 which allows water to exit the chamber. In some embodiments the horizontal tube 300 contains an internal orifice plate 440 which has a smaller diameter than the interior diameter of the tube 300. The orifice plate control the maximum amount of flow that is allowed to be processed through the horizontal flow wetland biofilter system chamber 100. The vertically extended perforated tube 420 has a cap 430 on the top that protrudes out of the top of the chamber 100 and allows for clean out.

The tube extends at least 5% the height of the permeable walls/partitions and generally extends to the same height as the said permeable walls/partitions. The top of the perforated tube is fitted with a cap that can be removed for cleaning out or other maintenance activities if needed. The perforated tube has a series of slots machined in it that run horizontally. The widths of the slots are equal to or smaller in size than the granular media which compose the media filtration bed. In some embodiments the perforated tube is wrapped in a netting sleeve when the granular media is smaller than the tube perforations. The perforations run from the bottom of the bottom of the tube where it comes in contact with the floor and they extend up vertically at least 50% the height of the tube. The vertically extending perorated tube connects, adjacent to the floor, to a non-perforated horizontally laying tube. This tube connects to the opening in the side wall of the chamber. In other embodiments the vertically extending perforated but connects directly to an opening in the floor in order to allow treated water to exit the chamber.

Figure 3:
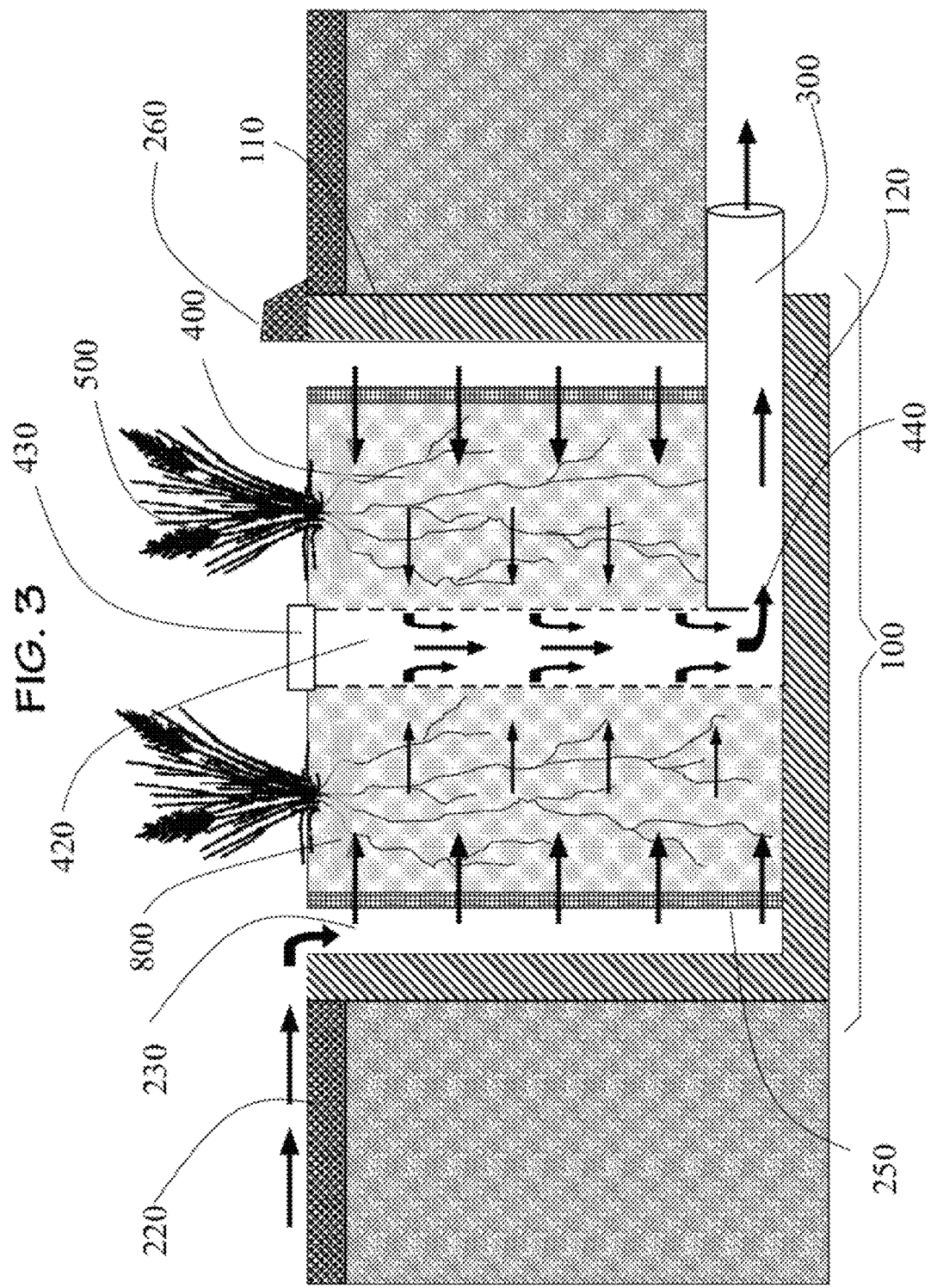
FIG. 3 is a side elevational section view of an embodiment of the horizontal flow wetland biofilter system installed below a ground surface level which receives water from an adjacent impervious surface area.

The horizontal flow wetland biofilter system, in some embodiments is placed at ground level with the top of the chamber 100 (FIG. 3) equal to the elevation of ground level 220. Stormwater runoff from the surfaces adjacent to the horizontal flow biofilter system is allowed to flow toward and directly into the perimeter catch basin 230 of the chamber. On sides of the chamber 100 in which flow is not needed to enter a concrete or asphalt curb 260 is built with a top elevation higher than the top of the chamber wall 110. In this embodiment, stormwater or other contaminated waters are allowed to enter the system directly by means of sheet or surface flow.

Hollow Structural Matrix

Figure 4:
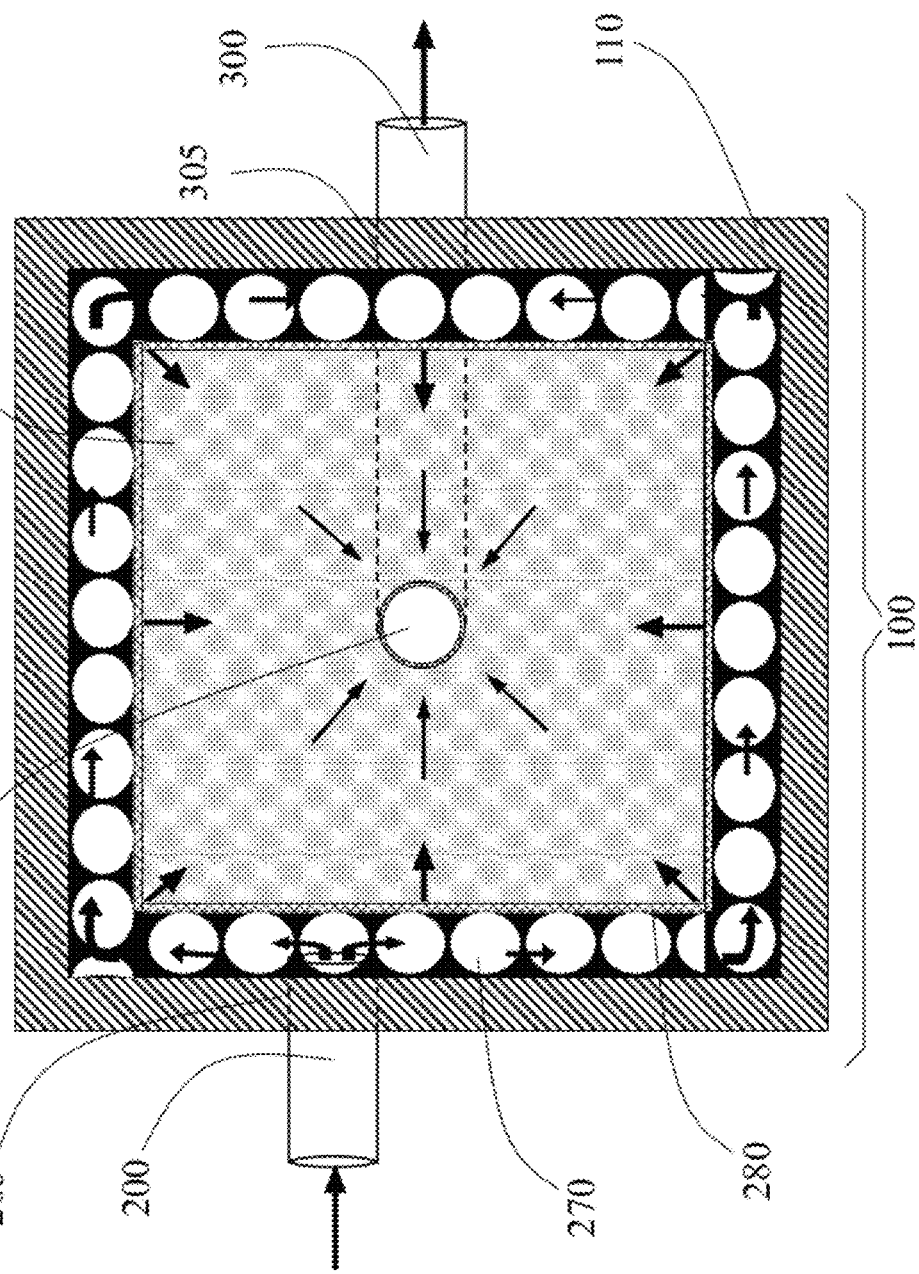
FIG. 4 is a top plan view of an embodiment of the horizontal flow wetland biofilter system where the catch basin is formed of a hollow structural matrix.
Figure 5:
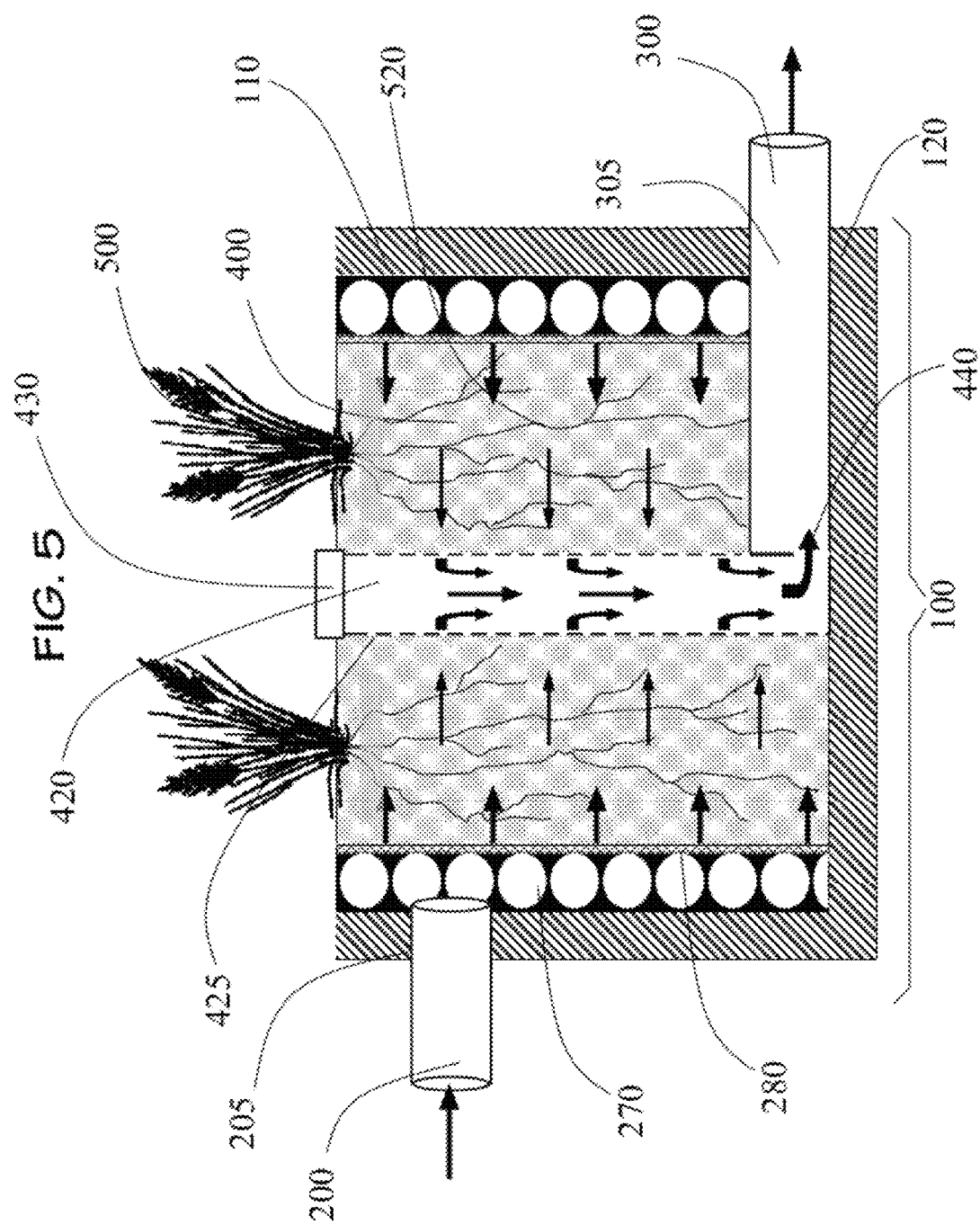
FIG. 5 is a side elevational section view of an embodiment of the horizontal flow wetland biofilter system showing the hollow structural matrix forming the catch basin.
Figure 6:
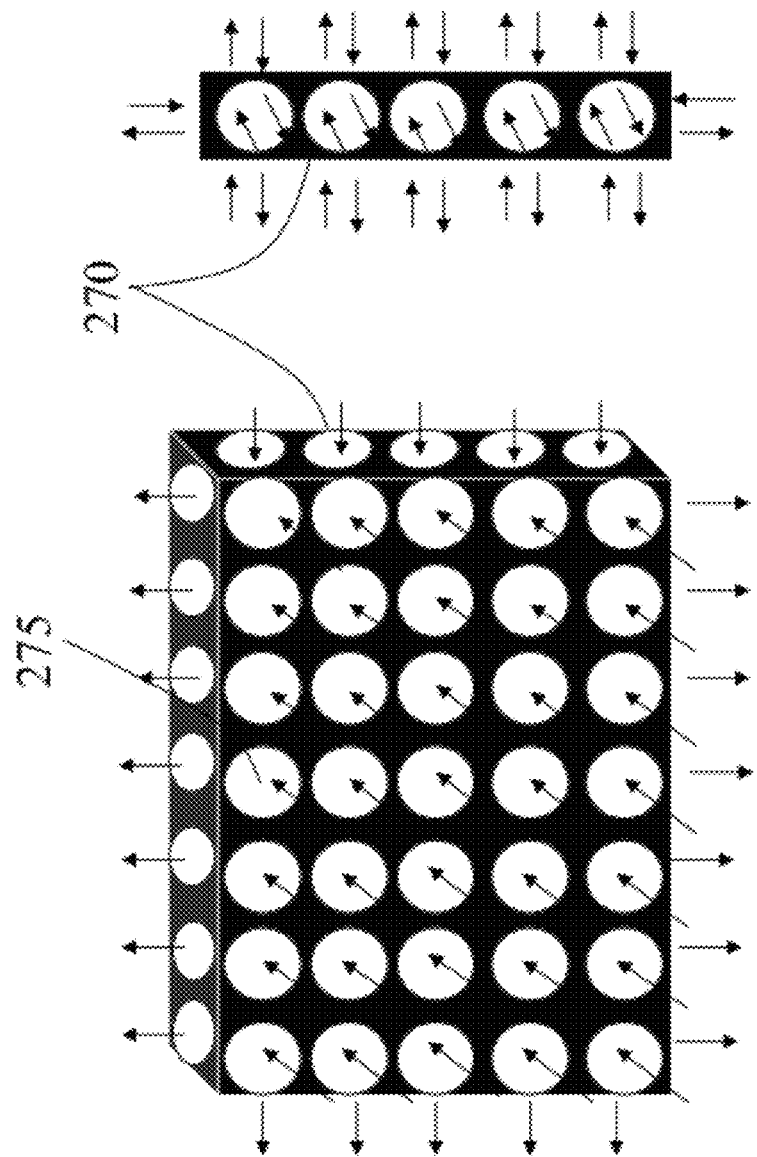
FIGS. 6A and 6B are front and side views, respectively, of an embodiment of the hollow structural matrix illustrating openings on all sides of the hollow strucrutal matrix.

In some embodimenst of the horizontal flow wetland biofilter system the chambers 100 (FIG. 4) perimeter catch basin 230 is created by the inclusion of a hollow structural matrix 270 which is another embodiment of the same invention. The hollow structural matrix 270 has a large surface and internal voids which makes up a majority of its volume. The void hallow areas have open paths 275 (FIG. 6) which allows water to flow in any direction unimpeded. The surface of the structural matrix is highly void with large openings. To prevent granules from the media filtration bed from entering the internal voids of the hollow structural matrix 270 it is covered or wrapped in netting, screen, fiber or similar 280. The hollow structural matrix 270 is covered in the netting 280 on at least the side that is adjacent to the media filtration bed 400 and generally covered on all sides. The hollow structural matrix 270 is strong enough to support the weight of the lateral loading of the media filtration bed 400. In one embodiment, the large hollow voids of the structural matrix are created by a series of circular opening that extend throughout the material on all three plains and are interconnecting and have opening spaces on all internal and external surfaces. The function of the hollow structural matrix 270 is identical to the perimeter catch basin 230 created by the spacing between the chamber walls 110 and the internal permeable walls/partitions 250.

The structural matrix has an internal void space of at least 10% and a void area of at least 25% on its surface making contact with the media filtration bed. Generally, the internal and surface void area of the structural matrix is above 90% and therefore acts and functions just like a 100% void space. Because the structural matrix has a large surface void area it is commonly covered in a netting, screen or fabric which have openings smaller than the size of the granular media within the media filtration bed. The structural matrix is designed to be strong enough to hold the lateral loading of the media filtration bed.

Adjacent Storage and Filtration Systems

Figure 7:
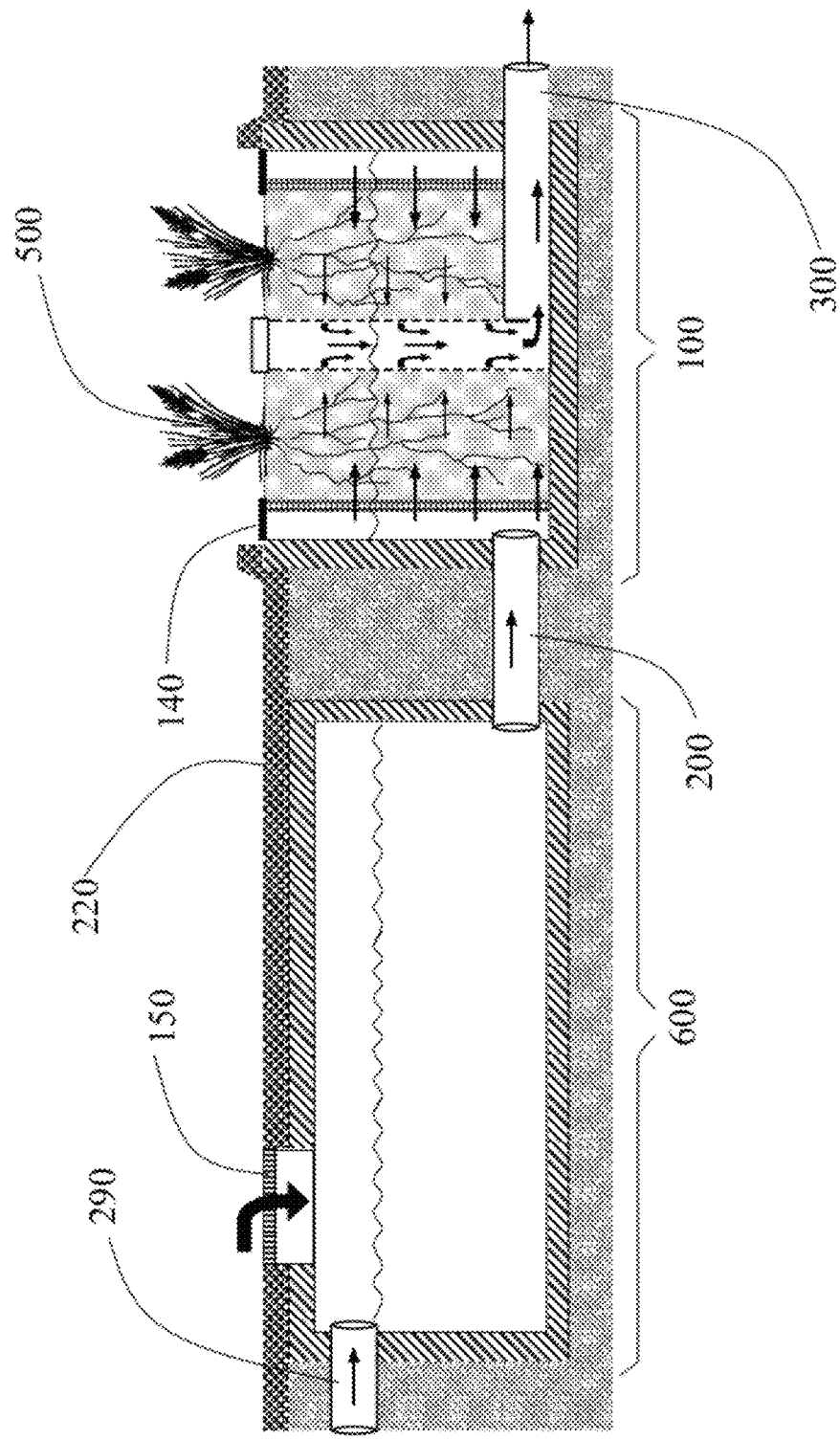
FIG. 7 is a side elevational section view of an embodiment of the horizontal flow wetland biofilter system installed below the ground surface level and connected with an adjacent underground water storage system.
Figure 8:
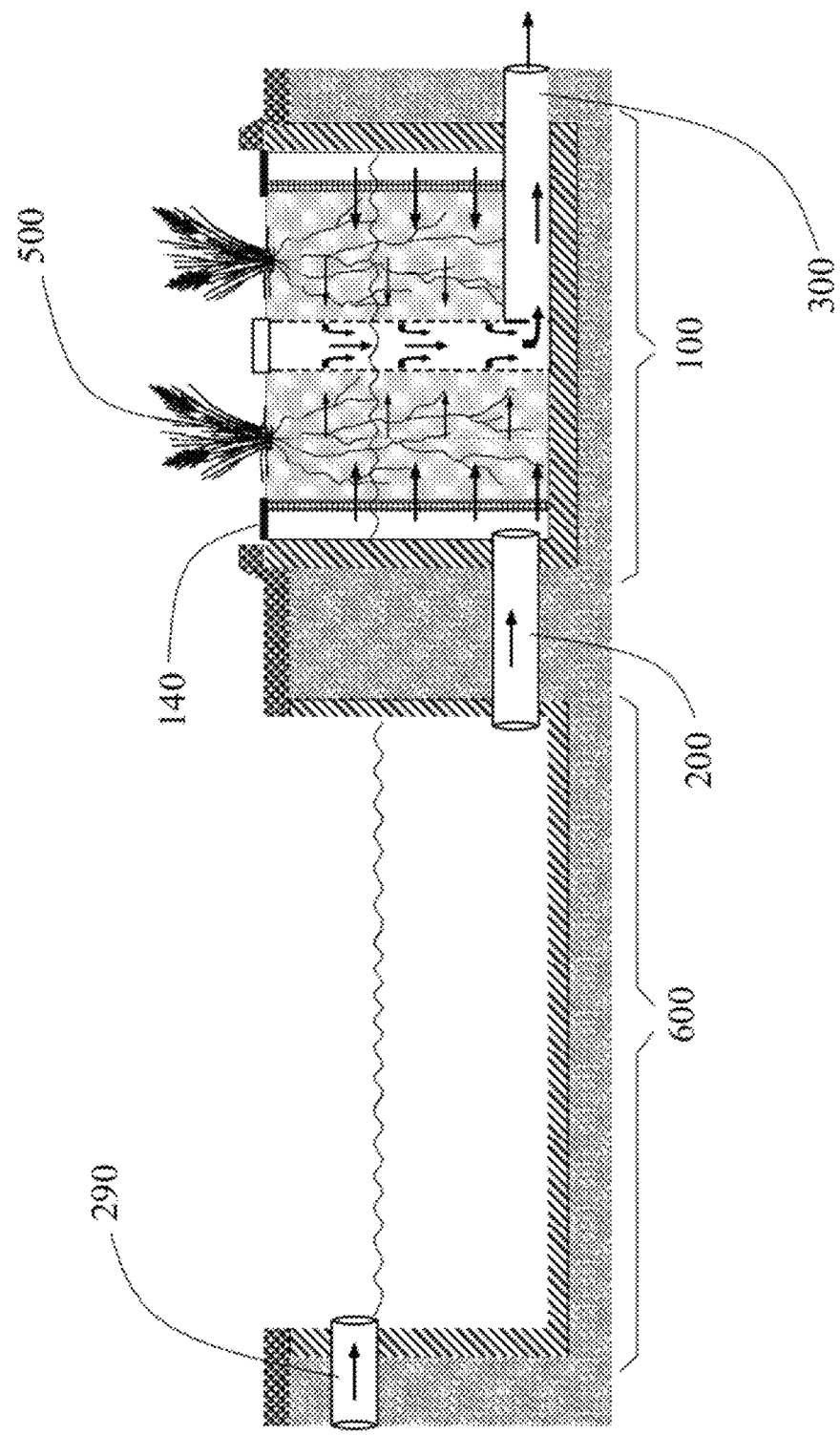
FIG. 8 is a side elevational section view of an embodiment of the horizontal flow wetland biofilter system installed below the ground surface level and connected with an adjacent above-ground water storage system.

The horizontal flow wetland biofilter system is designed to be used as a stand alone treatment system (FIG. 1, 2, 3, 4, 5) or in combination with upstream treatment or storage. In another embodiment, the chamber 100 is used in combination with an upstream storage system 600 which is placed below ground with a solid top (FIG. 7) and includes either an inflow pipe 290 from up stream collection systems and/or an grated opening 150 built into the solid top to allow water to be directly conveyed into the storage system 600. The storage system 600 can also have an open top (FIG. 8) which are commonly known as ponds, detention basins, or bio swales As water enters the storage system 600 the water level builds. As the water level builds it provides the head pressure needed to allow the water to enter the chamber 100 through a connecting pipe 200. As the water level builds in the storage system 600 it will build inside the perimeter catch basin 230 or hollow structural matrix 270 of the chamber 100. As water builds it is forced through the media filtration bed 400 and toward the center oriented vertically extending perforated tube 420. The tube 420 collects the treated water and conveys it downward and through the orifice plate 440 and out of the chamber 100 via the out flow pipe 300. The top of the chamber 100 has its catch basin covered by plates in configurations in which water is not wanted to enter directly into the perimeter catch basin 230.

Pretreatment Chamber

The chamber of the aforementioned embodiments can also be placed adjacent to a pre-treatment chamber that houses other treatment processes to remove specific pollutants before entering the treatment chamber of the said invention. Before water enters the chamber of the said invention is enters a pre-treatment chamber which is housed in the same structure, but separated by a common wall. The pre-treatment chamber contains an open area to encourage settling of particulates. The pre-treatment chamber also houses a screening basket under the grated, curb or pipe opening into the chamber to remove trash and debris. The pre-treatment chamber also houses filtration media which are housed within cartridges or other containers and contain filter media aimed at removing small particulates and hydrocarbons which are known to cause a majority of clogging issues in media bed filtration systems.

Figure 9:
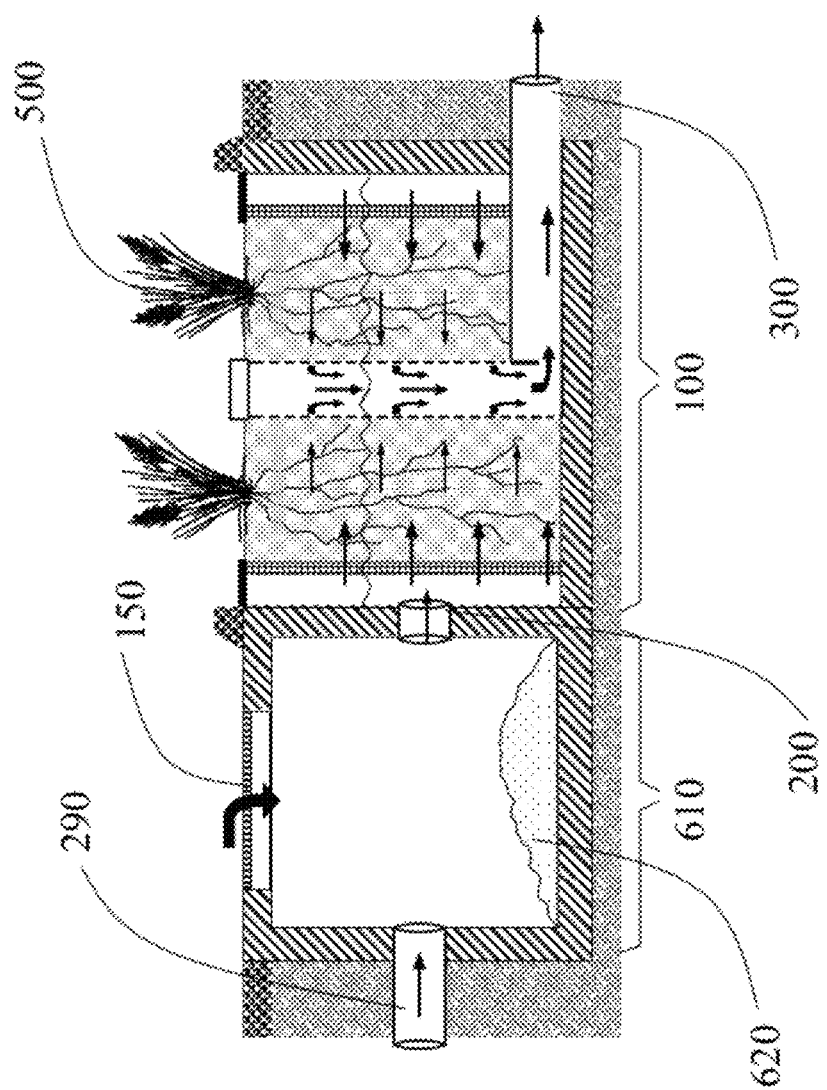
FIG. 9 is a side elevational section view of an embodiment of the horizontal flow wetland biofilter system installed below the ground surface level and separated by a common wall from an adjoining chamber which contains a settling area.
Figure 10:
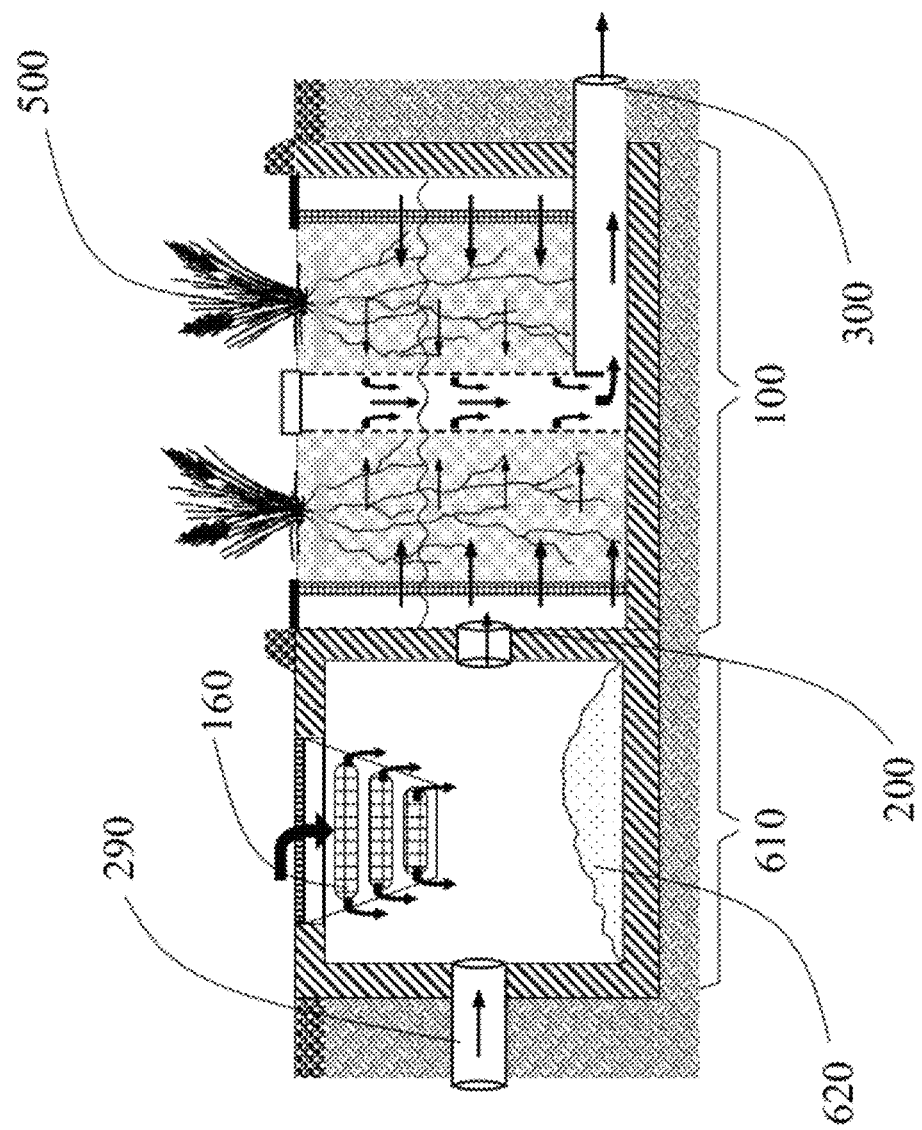
FIG. 10 is a side elevational section view of an embodiment of the horizontal flow wetland biofilter system where the adjoining chamber contains screens to remove trash and debris from inflowing water.

In other embodiments, the horizontal flow wetland biofilter system is designed as a two chamber system (FIG. 9) the treatment chamber 100 and a pretreatment chamber 610. The two chambers share a common wall and are interconnected via pipe or opening 200. The purpose of the pre-treatment chamber is to remove particulate pollutants prior to the water being conveyed into the treatment chamber 100 of the system. The pretreatment chamber can incorporate various filtration processes to remove particulates such as sediments, trash, debris and hydrocarbons. In one embodiment the pretreatment chamber is designed with a large settling area 620 with the inflow pipe 290 and the pipe or opening 200 interconnecting the pretreatment chamber 610 and treatment chamber 100 raised of the floor to allow for the accumulation of sediment and other particulates. Water can also enter the pretreatment chamber from the top via a grated or curbed inlet 150. In this embodiment the horizontal flow wetland biofilter system is a complete multi-stage treatment device for contaminated water that contains various concentrations of particulate and dissolved pollutants. To provide additional treatment stages the grate or curb opening 150 located in the top of the pre-treatment chamber (FIG. 10) is fitted with a screening basket 160 that can remove large solids such as trash and debris. The screening basket prevents floatables from accumulating in the settling area 620.

Figure 11:
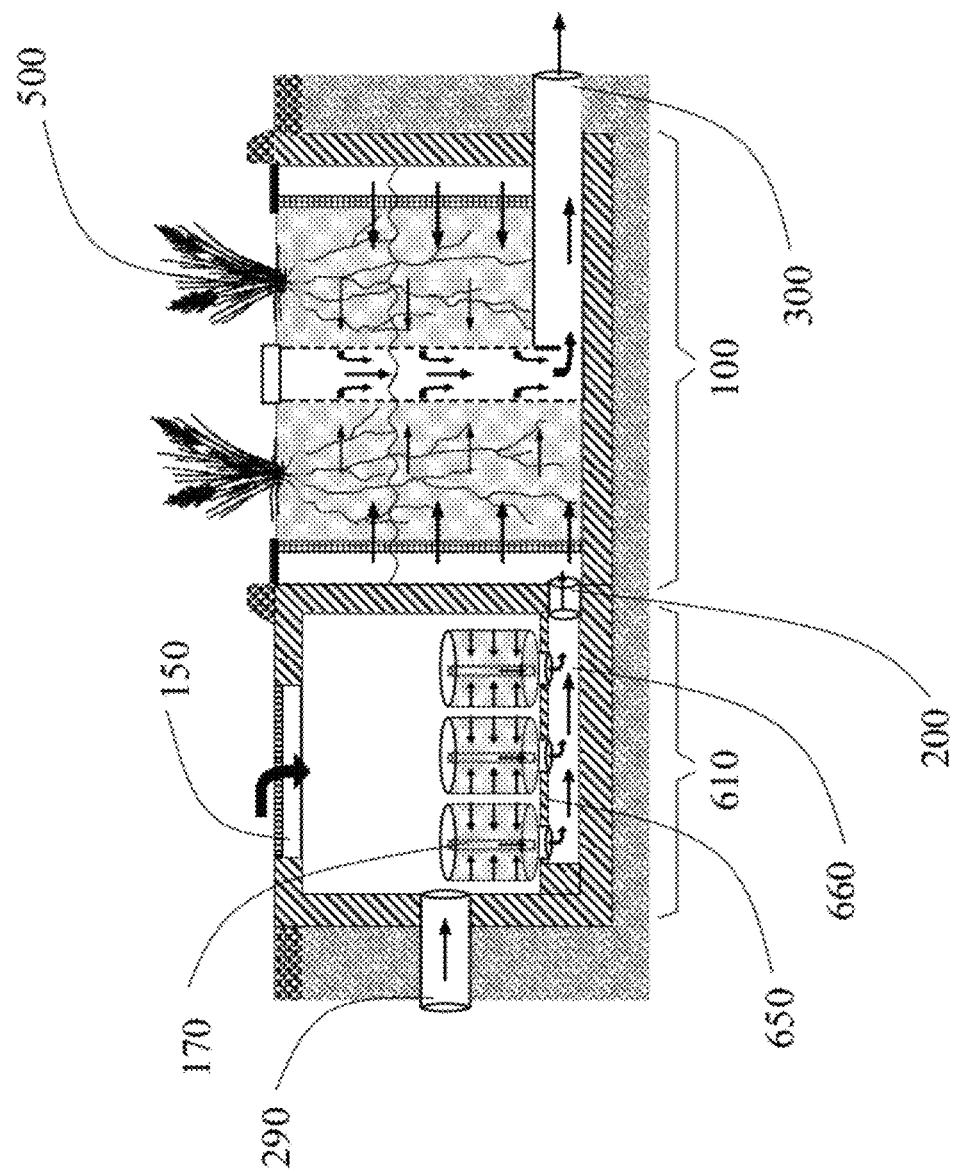
FIG. 11 is a side elevational section view of an embodiment of the horizontal flow wetland biofilter system where the adjoining chamber contains a plurality of media filter cartridges.

In further embodiments, the pretreatment chamber (FIG. 11) 610 is fitted with square, rectangular or round filter cartridges 170 that contain filter media with a central tube that is perforated to collect water and convey it through a false floor 650 and convey the water into a horizontal lying under drain pipe 660 which is connected to a pipe or opening 200 that transfers water into the perimeter catch basin 230 or hollow structural matrix 270 of the treatment chamber 100.

Figure 12:
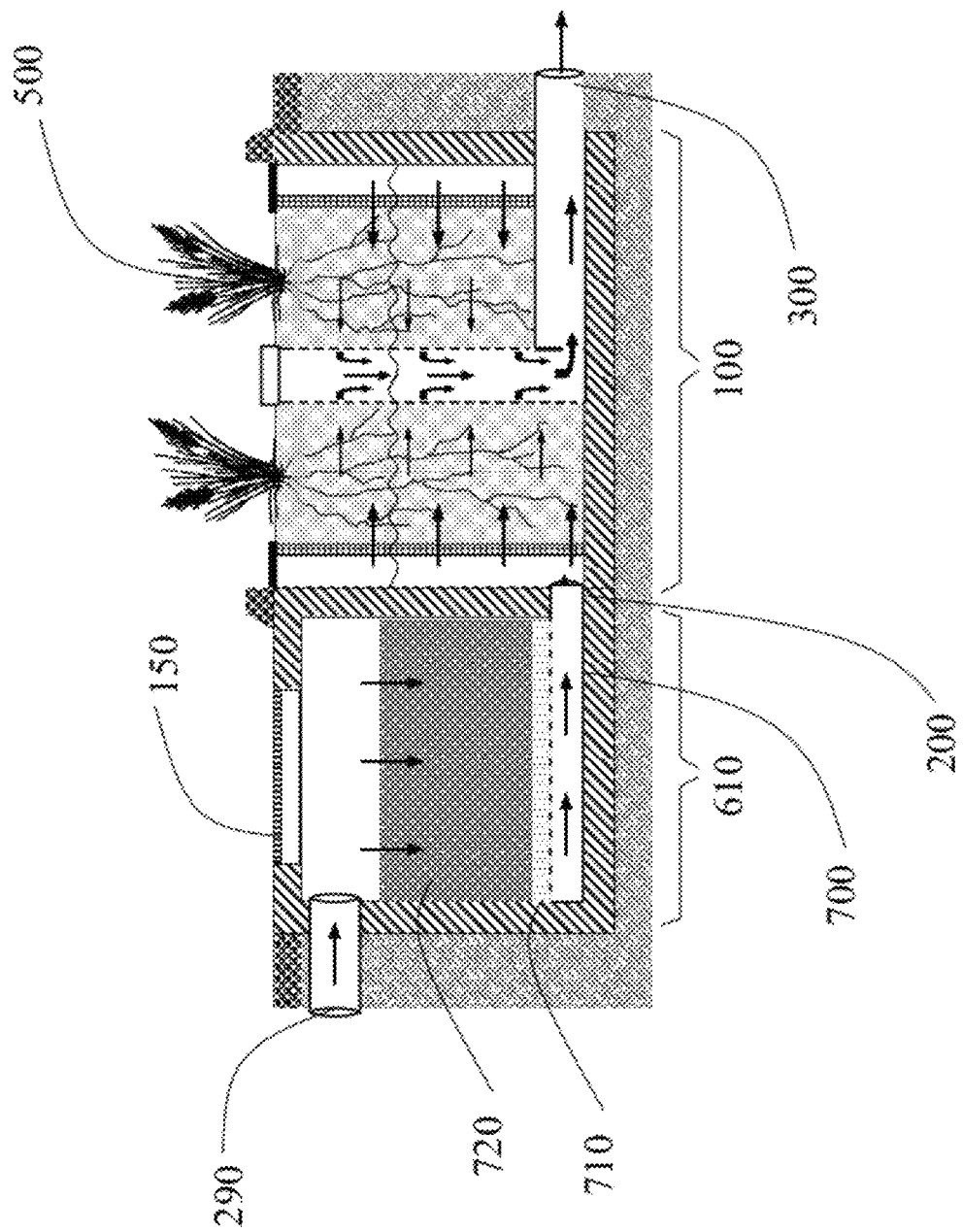
FIG. 12 is a side elevational section view of an embodiment of the horizontal flow wetland biofilter system where the adjoining chamber contains a media filtration bed with a lower drain and a solid top.
Figure 13:
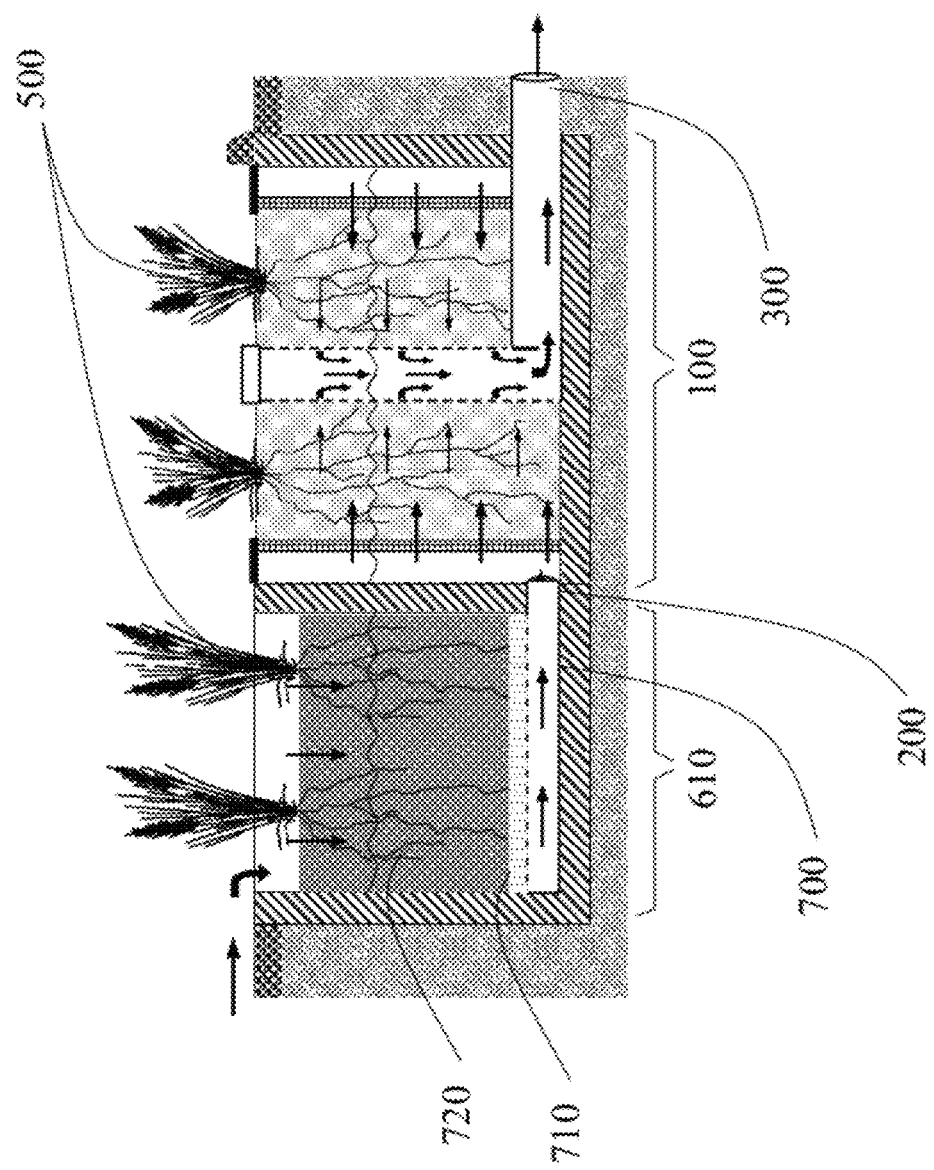
FIG. 13 is a side elevational section view of an embodiment of the horizontal flow wetland biofilter system where the adjoining chamber contains a media filtration bed with a lower drain and an open top.

In other embodiments (FIG. 12), the pretreatment chamber 610 is filled with filtration media 720 a majority of the height of the chamber. Under the filtration media is an under drain material 710 made of a granular substance that are larger in size than the granules of the filter media 720. Underneath the under drain material laying horizontally on the bottom of the pretreatment chamber 610 is a perforated tube the collects treated water and conveys it through an pipe or opening in the chamber wall 200 and into the perimeter catch basin 230 of the treatment chamber 100. The pretreatment chamber 610 in some embodiments (FIG. 13), has an open top in which water can enter the chamber directly from the surface and flows downward through the filter media 720. In this embodiment, the filter media 720 is exposed and incorporates living vegetation.

Figure 14:
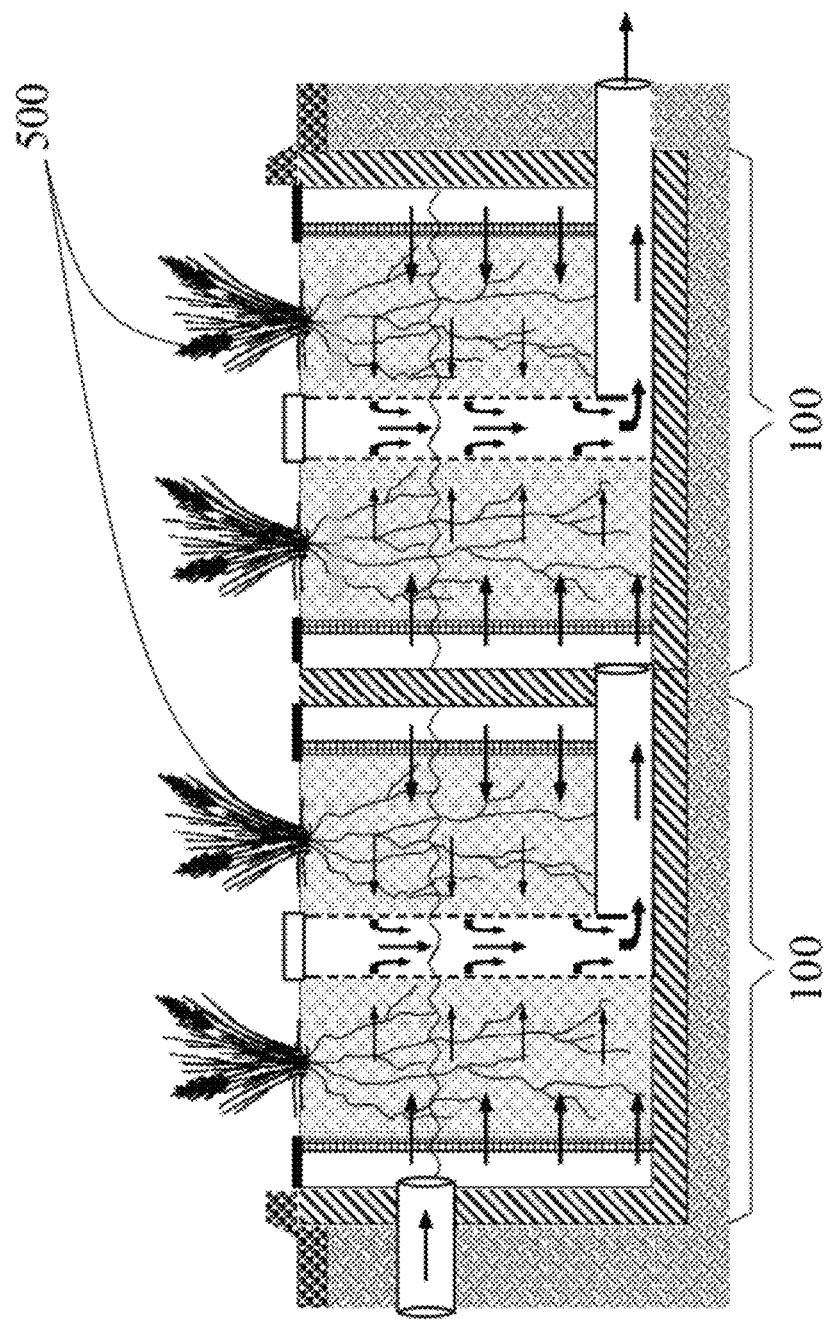
FIG. 14 is a side elevational section view of an embodiment of the horizontal flow wetland biofilter system where the system is connected with an adjacent horizontal flow wetland biofilter system.

The design of the horizontal flow wetland biofilter system chamber 100 is modular. Its design allows it to modular of various sizes. In some embodiments (FIG. 14), multiple chambers 100 can be placed side by side as individual structures or share the same structure with a common and adjacent wall separating them. This configuration allows the system to be used to treat a wide variety of pollutants with each chamber housing different filtration media targeted at treating different pollutants.

Restriction Plate

Figure 15:
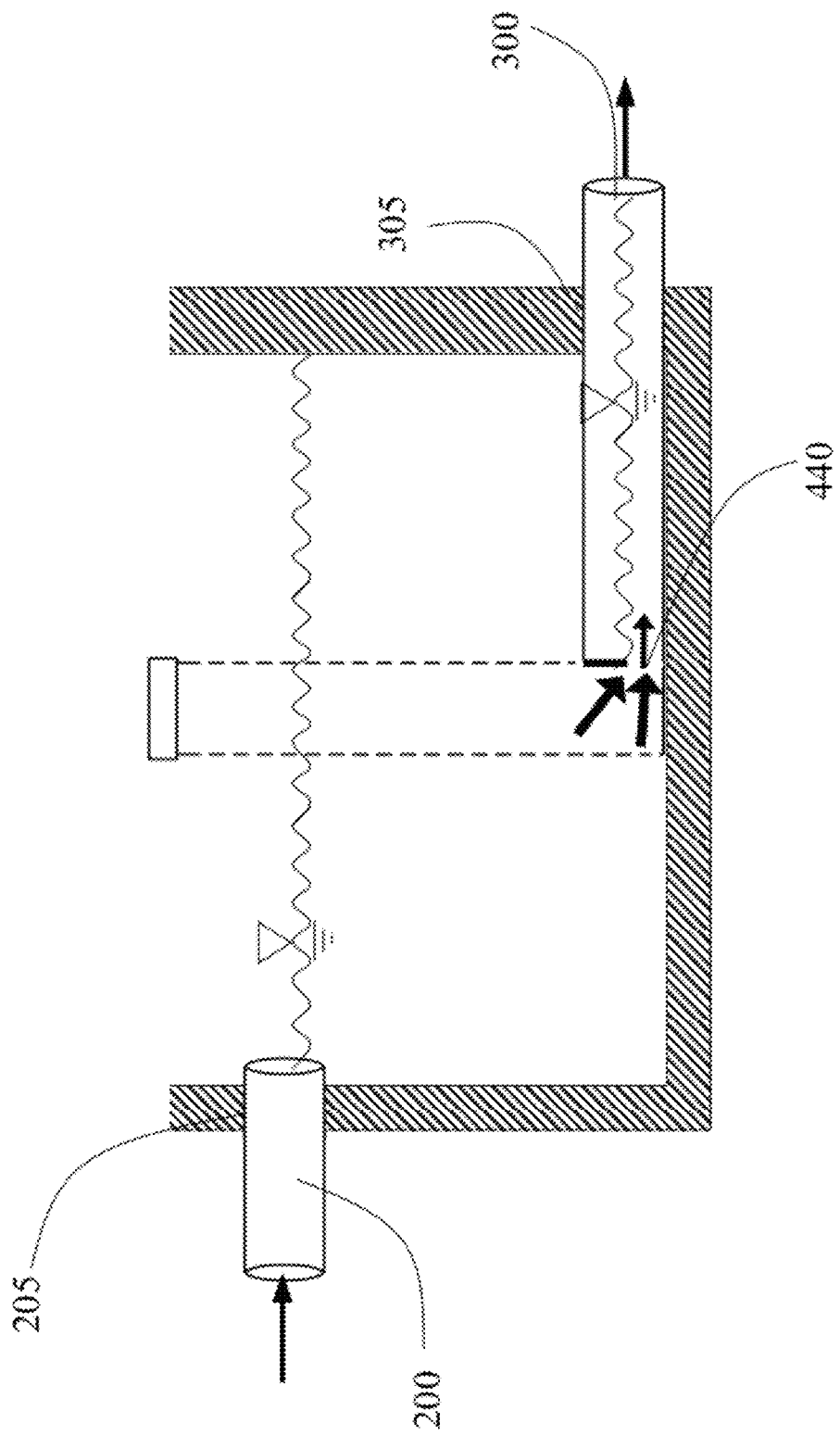
FIG. 15 is a side elevational section view of an embodiment of the horizontal flow wetland biofilter system illustrating hydraulic grade lines in the chamber upstream and downstream of an orifice flow control plate.

Flow control through the chamber 100 is important in order to control the loading rate on the media surface and hydraulic retention time within the media filtration bed 400. Surface loading rate and hydraulic retention time are important variables that affect the performance of the media and its ability to remove pollutants. Specific retention times are needed, specifically to allow for certain chemical reactions such as precipitation and ion exchange to occur between the surfaces of the media granules and dissolved pollutants. Most biofilter systems use the filter media itself as the controlling factor or critical point of restriction for the flow through the system. The problem with this concept is as the media starts to clog the flow through the media decreases and the designed peak treatment flow rate is no longer reached. To overcome this downfall the horizontal flow wetland biofilter system (FIG. 15) is designed with an orifice, or restriction plate 440 in the horizontally laying tube or pipe 300 which becomes the critical point of flow restriction in the system. The maximum amount of flow that can go through the orifice at peak hydraulic head is less than the hydraulic conductivity of the media filtration bed 400. This allows the system to continue and operate at the same peak flow rate even as the media may start to clog. This insures the system treats the specified amount of contaminated water over an extended period of time.

The size of the orifice is of specific size, hydraulically calculated and tested to allow a set amount of water to process through the invention when water within the chamber is at maximum level. The restriction plate sets the peak treatment flow rate in the system. The flow through the orifice is less than the flow rate through the media filtration bed itself. This provides a safety factor to account for any clogging that may occur within the filter media itself over time. Other systems peak treatment flow rate is controlled by the hydraulic conductivity of the media itself. With these systems as clogging of the media starts to occur the flow rate through the media filtration bed decreases and therefore is no longer treating the amount of water it was designed to treat.

Flotation Valve

Figure 16:
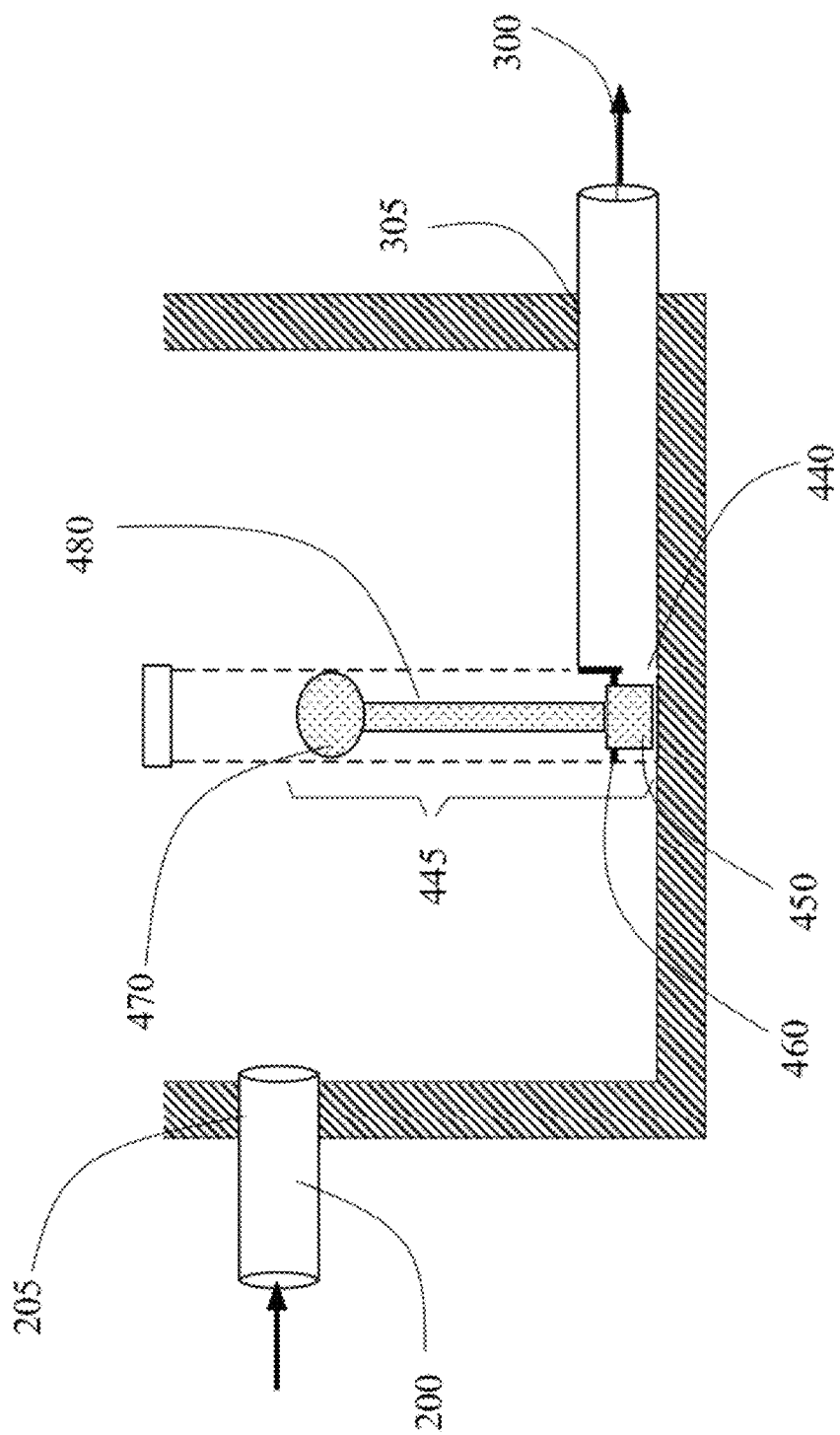
FIG. 16 is a side elevational section view of an embodiment of the horizontal flow wetland biofilter system with a perforated tube containing a float valve in a closed position.
Figure 17:
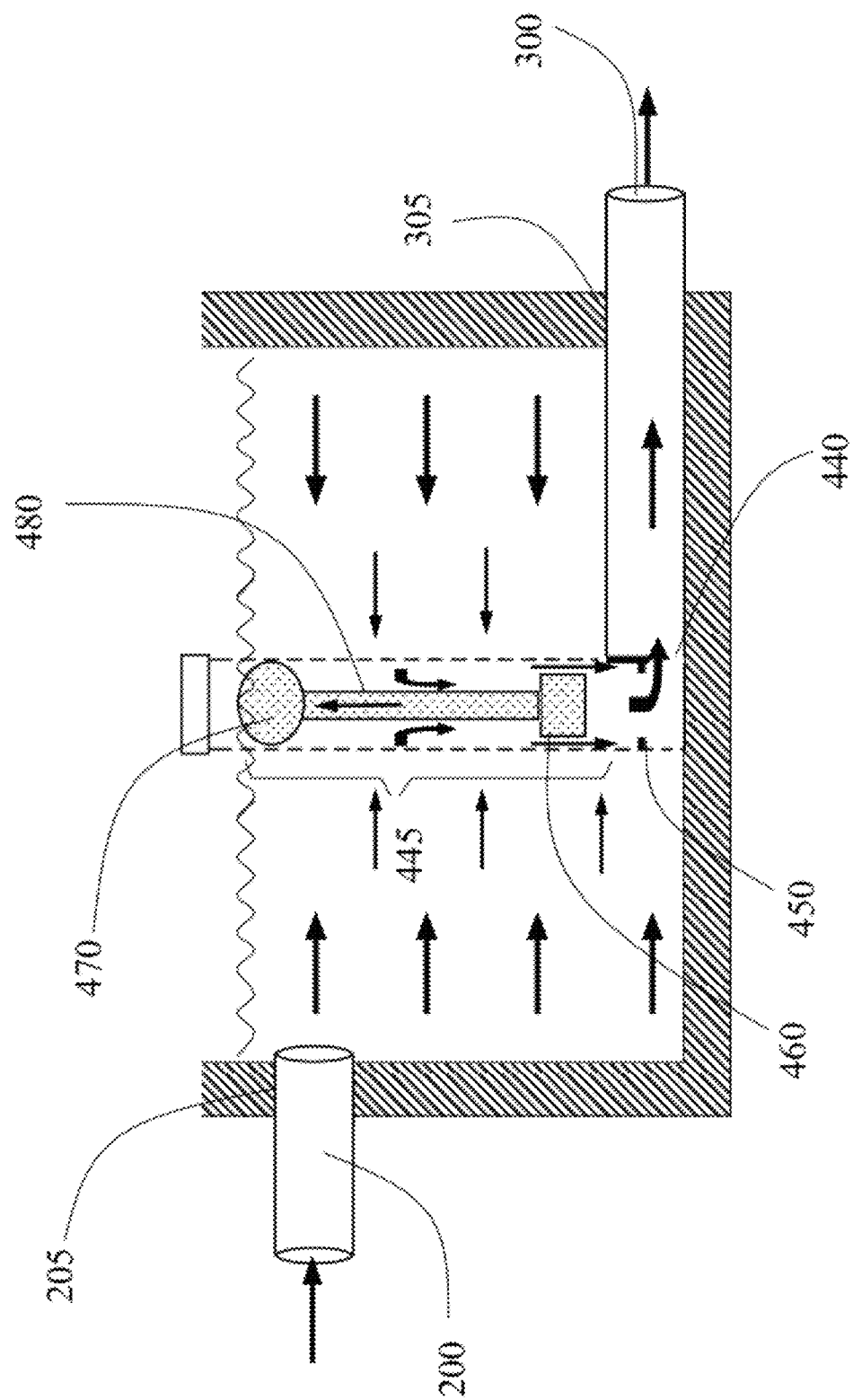
FIG. 17 is a side elevational section view of an embodiment of the horizontal flow wetland biofilter system illustrating the float valve in an open position.

In one exemplary embodiment, the flow control through the system is further enhanced (FIG. 16) by the inclusion of an internal floatation valve 445 housed inside the tube. The tube controls at what level the water must reach in the chamber before it is allowed to discharge out of the chamber. The reason for this device is to ensure even distribution of contaminated water throughout the vertical height of the media filtration bed's surface area over a range of different flow rates which correlate to the wide variation of rain fall patterns. The flotation valve 445 has three pieces: the float 470, the connecting rod 480 and the valve stop 460. The bottom of the vertically extending perforated riser 420 has a valve seat 450 in the bottom that prevents water from flow through it and into the orifice plate 440 located in the horizontally lying discharge tube 300 when the internal floatation valve 445 is in the off position. The internal float valve remains closed until the water level in the treatment chamber 100 reaches a level greater than 50% the height of the chamber (FIG. 17). Once the water reaches the specified height the internal float valve 445 raises with the water level and the valve stop 460 raises above the valve seat 450 and allows the water to pass downward around the valve stop 460 and through the valve seat 450 and then travels through the orifice plate and exit the chamber through the horizontal tube 300 and pass through the opening in the chamber wall 305. The internal float valve will once again close as water flow to the chamber 100 ceases and the water level falls below 50% the height of the chamber 100. To allow the water to drain all the way to the bottom of the chamber after the internal float valve 445 closes and the valve stop 460 sets inside the valve seat 450, a small flow orifice 490 is located on the bottom of the valve stop 460 and spans the length of the valve stop 460 (FIGS. 18A, 18B). FIG. 18A illustrates a front view of the small flow orifice 490 showing the opening, while FIG. 18B illustrates a side view showing the flow of influent from a rear opening to a front opening of the small flow orifice 490. A very small amount of flow is allowed through this small flow orifice 490 which is substantially smaller than the flow control orifice 440, and it therefore allows the chamber 100 to drain dry during periods when no water is being treated. Typically the flow rate though the small flow orifice is less than one tenth the peak treatment flow rate of the treatment chamber.

Catch Basin Features

The configuration of the filtration chamber with a perimeter catch basin that extends vertically between the media filtration bed and the walls serves two distinct and unique advantages over traditional downward flow media filtration beds. First, it maximizes the initial media surface area for a given volume of liquid and thereby lowers the hydraulic loading rate on the media. The increased surface area improves performance and longevity of the biofilter apparatus and also provides an area for larger particulates that are contained in the influent contaminated water to settle out before the water penetrates the filtration media. Secondly, the horizontal flow prevents the larger particulates from accumulating on top of a media filtration bed, as with a downward flow system where influent water is received on a top portion of the apparatus. The system is especially apt for treating contaminated water from parking lots, roads, rooftops and other areas which contaminated stormwater can originate.

Media Filtration

The media filtration bed contains granular filtration media such as but not limited to: zeolite, expanded aggregate, perlite, activated charcoal, activated alumina, iron oxide, polymers, waste water residuals and other physical, biological, or chemical filter media. The media filtration bed incorporates a layer of non-organic soil-less growing media near the top of the media filtration bed column to assist in the establishment of vegetation and to promote growth and longevity of vegetative life. It does so by retaining moisture close to the surface for roots to tap into and establish themselves. The non-organic soil-less growing media, such as stonewool or rockwool holds substantial moisture and provides an ideal air to water ratio which is ideal for plant growth.

Horizontal Flow

Other flow paths such as horizontal or upward vertical flow have proven to have fewer issues with clogging. Vertical upward flow has the least amount of clogging issues but also has the most issues with channeling. The horizontal flow path provides minimized clogging and channeling concerns and promotes good performance and longevity in biofilter systems. Systems with horizontal flow media bed filtration also have the advantage of being able to accept incoming stormwater subsurface via pipe or upstream storage system while still being able to grow vegetation on the upper surface. Traditional downward flow systems have limitations in this area along with having a large head drop between inflow and outflow points. In contrast, horizontal flow systems do not need a large head drop between inflow and outflow points, as the hydraulic force of the water itself drives it through the filtration media.

The horizontal flow path also allows the biofilter apparatus to be easily connected to an adjacent pretreatment chamber which may house other forms of treatment such as screening, separation and media filtration. These other forms of treatment can be easily incorporated with out additional head drop to further reduce the risk of clogging to the media filtration bed.

Additionally, horizontal flow into and through media clogs slower when compared to downward flow media bed filtration systems. Horizontal flow path media filtration beds have the initial media surface extending vertically so that the contaminated water makes contact first with the media surface. Therefore, the media surface is parallel to the force of gravity, which causes particles that make contact with the surface of the media to fall off and travel downward away from the surface of the media.

Implementation

In general, the invention is used for the treatment of stormwater and similar contaminated water sources. This system is designed to be utilized in urbanized or other developed areas in which the percentage of impervious areas is generally high. The invention when utilized by those skilled in the art is generally placed adjacent to any impervious area which generates rain water runoff or runoff of other contaminated waters from its surface. The invention also can be directly connected to specific point sources of contaminated waters. When used in stormwater applications the systems is generally used to treat rain water and runoff generated by human activities such a irrigation, car washing, and similar which are generated from parking lots, road ways, public plazas, industrial facilities, freeways and rooftops. Since the system has an open top and that contains live vegetation, the system is generally located adjacent to hardscape or impervious areas when some form of landscaping exists. The invention is generally located above ground with the top of the chamber equal to the finish surface. In some embodiments the invention is located above ground to accept waters from rooftops or elevated plazas or bridges.

The modular design of the treatment chamber makes it easily scalable to various sizes and shapes, though generally square or rectangular. The concept of this invention also will work in a round orientation. The horizontal flow path through the media which makes it unique to biofiltration systems in this field offers several advantages. As mentioned the flow orientation of this invention minimizes clogging concerns when compared to downward flow systems. The invention also creates up to four times the media surface area for a given volume of a media filtration bed. In one embodiment illustrated in FIG. 19, the interior walls/partitions 250 of the media filtration bed 400 may have an irregular shape with a series of grooves 255 along its sides, further increasing the surface area which interacts with the incoming influent. The horizontal flow path of the invention also offers allows for several individual chambers to be placed side by side in series without any hydraulic drop in the chamber. By doing so several chambers can be placed is series, with each successive chamber containing a filter media that offers higher levels of treatment. One example of this would be for the first chamber to contain perlite to remove particulates, the next chamber housing polymers to remove hydrocarbons, and the following chamber housing activated alumina to remove dissolved nutrients.

The invention also can be placed adjacent to an upstream storage system. The advantage of this invention is no hydraulic head drop is required between the bottom of the storage system and the bottom on the said inventions floor. With stormwater requirements moving toward volume base design a biofilter system which is easy to adapt downstream to a storage system is of need.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

What is claimed is:

1. A wetland biofilter chamber comprising:
   one or more outer side walls and a floor section defining a substantially enclosed chamber with the top open to the air;
   a media filtration bed disposed within the chamber and defined by one or more permeable inner side walls, wherein the permeable inner side walls of the media filtration bed are separated from the outer side walls of the chamber and define a catch basin for receiving an influent;
   a collection tube disposed within the media filtration bed and extending vertically from a top portion of the media filtration bed to a lower portion of the media filtration bed; and
   at least one outlet opening connecting the lower portion of the collection tube with an outside of the chamber.

2. The wetland biofilter chamber of claim 1, wherein the outer side walls and floor section are impermeable.

3. The wetland biofilter chamber of claim 1, wherein the one or more outer side walls include an intake opening to receive an influent into the catch basin.

4. The wetland biofilter chamber of claim 3, wherein the intake opening is located on a lower half of a side wall.

5. The wetland biofilter chamber of claim 1, further comprising an outlet tube disposed horizontally across the floor section of the chamber and connecting the collection tube with the at least one outlet opening.

6. The wetland biofilter chamber of claim 1, wherein the collection tube is permeable.

7. The wetland biofilter chamber of claim 6, wherein the permeable collection tube is perforated.

8. The wetland biofilter chamber of claim 1, wherein the height of the collection tube is approximately 5% to approximately 100% of the height of the media filtration bed.

9. The wetland biofilter chamber of claim 1, wherein the collection tube further comprises a restriction plate which restricts the flow of filtered influent to the outlet tube.

10. The wetland biofilter chamber of claim 9, wherein the restriction plate is connected with a flotation valve disposed within the collection tube which controls the restriction plate based on a level of influent in the collection tube.

11. The wetland biofilter chamber of claim 1, wherein the catch basin has a width of approximately 0.1 inches to approximately 10 feet.

12. The wetland biofilter chamber of claim 1, wherein the height of the inner side walls is approximately 25% to approximately 100% of the height of the chamber walls.

13. The wetland biofilter chamber of claim 1, wherein the thickness of the media filtration bed is approximately 0.25 inches to approximately 80 feet.

14. The wetland biofilter chamber of claim 1, wherein the catch basin includes a substantially hollow structural matrix.

15. A method of filtering influent in a biofilter chamber, comprising:
    receiving an influent into a catch basin of the biofilter chamber with one or more outer side walls and a floor section defining a substantially enclosed chamber with the top open to the air, wherein the catch basin is disposed around an inner periphery of the chamber between one or more outer side walls of the chamber and one or more inner permeable inner side walls of a media filtration bed;
    filtering the influent through the media filtration bed;
    collecting the filtered influent from the media filtration bed at a collection tube extending vertically within the media filtration bed from a top portion of the media filtration bed to a lower portion of the media filtration bed;
    passing the filtered influent from the collection tube to at least one outlet opening connected with an outside of the biofilter chamber.

16. The method of claim 15, further comprising receiving the influent into the catch basin from an intake opening located on a lower half of a side wall.

17. The method of claim 15, further comprising receiving the influent into the catch basin from an opening in the top of the biofilter chamber.

18. The method of claim 15, further comprising passing the filtered influent from the collection tube to the at least one outlet opening using an outlet tube disposed horizontally across the floor section of the chamber and connected on a first end with the collection tube and on a second end with the at least one outlet opening.

19. The method of claim 15, further comprising restricting the flow of influent using a restriction plate disposed within the collection tube.

20. The method of claim 19, further comprising restricting the flow of filtered influent when a flotation valve disposed within the collection tube and connected with the restriction plate falls below a defined level.

* * * * *